US011915574B2

(12) United States Patent
Kawamura et al.

(10) Patent No.: US 11,915,574 B2
(45) Date of Patent: Feb. 27, 2024

(54) ALERT SYSTEM TO OUTPUT ALERT ABOUT OCCUPANT LEFT IN VEHICLE

(71) Applicant: SUBARU CORPORATION, Tokyo (JP)

(72) Inventors: Kousei Kawamura, Tokyo (JP); Tomoya Kanagawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/879,475

(22) Filed: Aug. 2, 2022

(65) Prior Publication Data
US 2023/0068982 A1 Mar. 2, 2023

(30) Foreign Application Priority Data

Aug. 25, 2021 (JP) .................. 2021-136758

(51) Int. Cl.
| G08B 21/24 | (2006.01) |
| G06V 20/58 | (2022.01) |
| G06V 20/59 | (2022.01) |
| H04N 23/695 | (2023.01) |
| B60R 11/00 | (2006.01) |
| B60Q 5/00 | (2006.01) |
| B60R 11/04 | (2006.01) |

(52) U.S. Cl.
CPC ............ *G08B 21/24* (2013.01); *G06V 20/58* (2022.01); *G06V 20/59* (2022.01); *H04N 23/695* (2023.01); *B60Q 5/005* (2013.01); *B60R 11/04* (2013.01); *B60R 2011/008* (2013.01)

(58) Field of Classification Search
CPC ........ G08B 21/24; G08B 21/22; G06V 20/58; G06V 20/59; H04N 23/695; B60Q 5/005; B60R 11/04; B60R 2011/008; B60R 25/31
See application file for complete search history.

(56) References Cited

U.S. PATENT DOCUMENTS

2022/0089237 A1* 3/2022 Sverdlov ................ B25J 9/1697

FOREIGN PATENT DOCUMENTS

| CN | 111791823 A | * 10/2020 |
| JP | 2009-107527 A | 5/2009 |
| JP | 2018-142130 A | 9/2018 |

* cited by examiner

*Primary Examiner* — Brian Wilson
(74) *Attorney, Agent, or Firm* — Rimon P.C.; Tomoki Tanida

(57) ABSTRACT

An alert system configured to output an alert about an occupant being left in a vehicle includes an external-environment camera, a determiner, and an alert controller. The external-environment camera captures images at least one of which includes the occupant outside the vehicle. The determiner determines whether a child including an infant is likely to have been left in the vehicle. The alert controller outputs an alert if the child is likely to have been left in the vehicle. The determiner determines whether the child is likely to have been left in the vehicle, based on a change in the images from one of a presence state and an absence state of a person or an object outside the vehicle in a first image of the images to another of the presence state and the absence state of the person or the object in a second image of the images.

18 Claims, 12 Drawing Sheets

ALERT SYSTEM TO OUTPUT ALERT ABOUT OCCUPANT LEFT IN VEHICLE

CROSS-REFERENCE TO RELATED APPLICATIONS

The present application claims priority from Japanese Patent Application No. 2021-136758 filed on Aug. 25, 2021, the entire contents of which are hereby incorporated by reference.

BACKGROUND

The disclosure relates to an alert system to be used for a vehicle to output an alert about an occupant being left in the vehicle.

There is a possibility that a child including an infant is left in a vehicle alone. To take measures against this possibility, a history of the opening/closing of the doors of a vehicle may be recorded, and if the opening/closing history is recorded, an alert may be output when an occupant leaves the vehicle.

In the technology disclosed in Japanese Unexamined Patent Application Publication (JP-A) No. 2009-107527, an image indicating the inside of a vehicle before a door is opened and that after the door is closed are compared with each other, and an occupant is detected based on a difference between the two images.

SUMMARY

An aspect of the disclosure provides an alert system configured to output an alert about an occupant being left in a vehicle. The alert system includes an external-environment camera, a determiner, and an alert controller. The external-environment camera is configured to capture images. At least one of the images includes the occupant outside the vehicle. The determiner is configured to determine whether a child including an infant is likely to have been left in the vehicle. The alert controller is configured to output an alert in a case where the child is likely to have been left in the vehicle. The determiner is configured to determine whether the child is likely to have been left in the vehicle, based on a change in the images from one of a presence state and an absence state of a person or an object outside the vehicle in a first image of the images to another of the presence state and the absence state of the person or the object in a second image of the images.

An aspect of the disclosure provides an alert system configured to output an alert about an occupant being left in a vehicle. The alert system includes an external-environment camera and circuitry. The external-environment camera is configured to capture images. At least one of the images includes the occupant outside the vehicle. The circuitry is configured to determine whether a child including an infant is likely to have been left in the vehicle, based on a change in the images from one of a presence state and an absence state of a person or an object outside the vehicle in a first image of the images to another of the presence state and the absence state of the person or the object in a second image of the images. The circuitry is configured to output an alert in a case where the child is likely to have been left in the vehicle.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to describe the principles of the disclosure.

DETAILED DESCRIPTION

An occupant may place his/her belongings in a vehicle, as disclosed in JP-A No. 2018-142130.

If, as discussed above, an alert is output merely based on the opening/closing history of the doors, an alert is output when an occupant has opened a door, placed his/her belongings, and closed the door.

While the above-described approach to outputting an alert based on the opening/closing history of the doors is meaningful in terms of the safety of a child including an infant who may have been left in the vehicle alone, an occupant using the vehicle may find this approach inconvenient and slightly excessive.

Some children including infants are physically small. When such a small child has got in a vehicle, it may enter a blind spot, such as the back of a seat or between seats, and an image of the child inside the vehicle may not be properly taken. With the approach to detecting a child inside a vehicle based on images of the inside of the vehicle, such as that disclosed in JP-A No. 2009-107527, a child may not always be detected properly.

It is thus desirable to output an alert about an occupant being left in a vehicle more suitably and more reliably in accordance with the situation.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

First Embodiment

Figure 1:
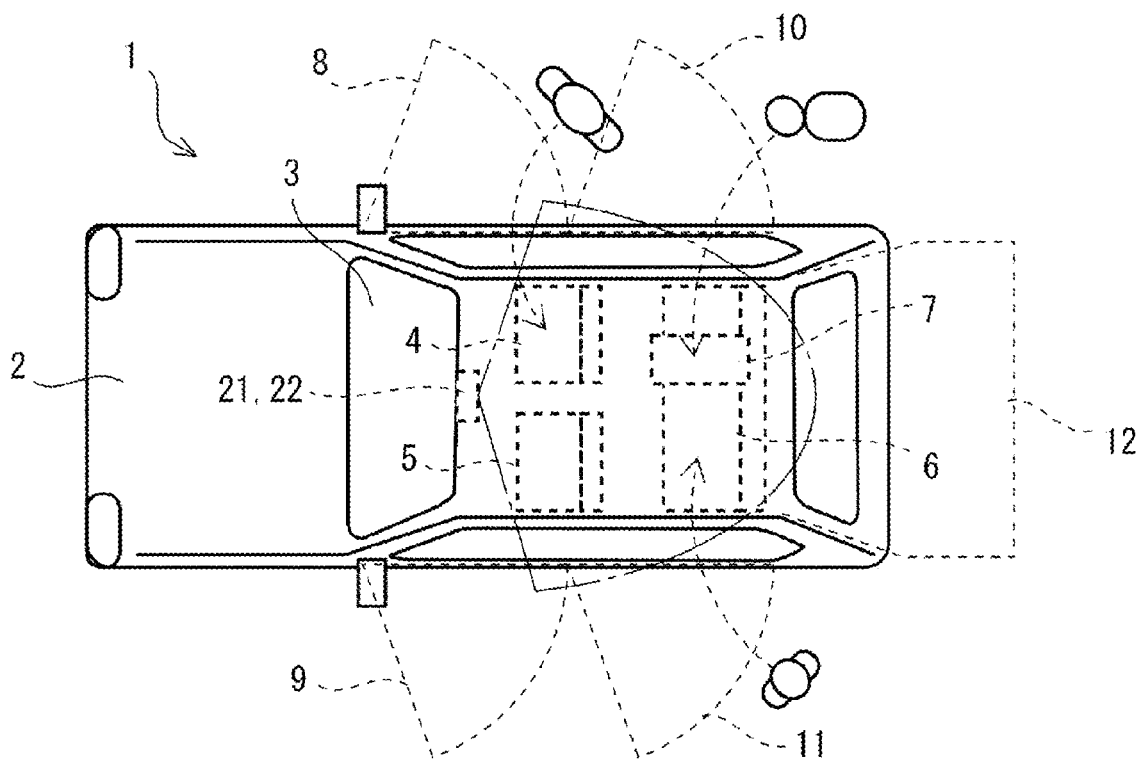
FIG. 1 is a schematic plan view of an automobile using an alert system according to an embodiment of the disclosure.

FIG. 1 is a schematic plan view of an automobile 1 using an alert system 20 which outputs an alert about an occupant being left in the automobile 1 (hereinafter simply called the alert system 20) according to a first embodiment of the disclosure.

The automobile 1 is an example of a vehicle.

The automobile 1 illustrated in FIG. 1 includes a body 2. The body 2 includes a compartment 3. Inside the compartment 3, a driver's seat 4, a passenger seat 5, and a rear seat 6 are placed. An infant car seat 7 is fixed on the rear seat 6.

The body 2 includes a right front door 8, a left front door 9, a right rear door 10, a left rear door 11, and a rear gate 12. A driver, for example, opens and closes the right front door 8 to get in the automobile 1 and sits in the driver's seat 4. Another occupant, for example, opens and closes the left front door 9 to get in the automobile 1 and sits in the passenger seat 5. A child, for example, opens and closes the right rear door 6 or the left rear door 11 to get in the automobile 1 and sits in the rear seat 6. An occupant, for example, opens and closes the rear gate 6 to place belongings in the compartment 3. The ranges of the right front door 8, left front door 9, right rear door 10, left rear door 11, and rear gate 12 in their closed states and in their opened states are indicated by the broken lines in FIG. 1.

In FIG. 1, plural occupants, such as an adult, an infant, and a child, who are to get in the automobile 1, are illustrated.

Occupants including the driver each open one of the above-described doors, get in the automobile 1, and close the door.

An adult, such as the driver or another occupant, may also open the right rear door 10, get a child including an infant into the automobile 1, and close the right rear door 10.

Figure 2:
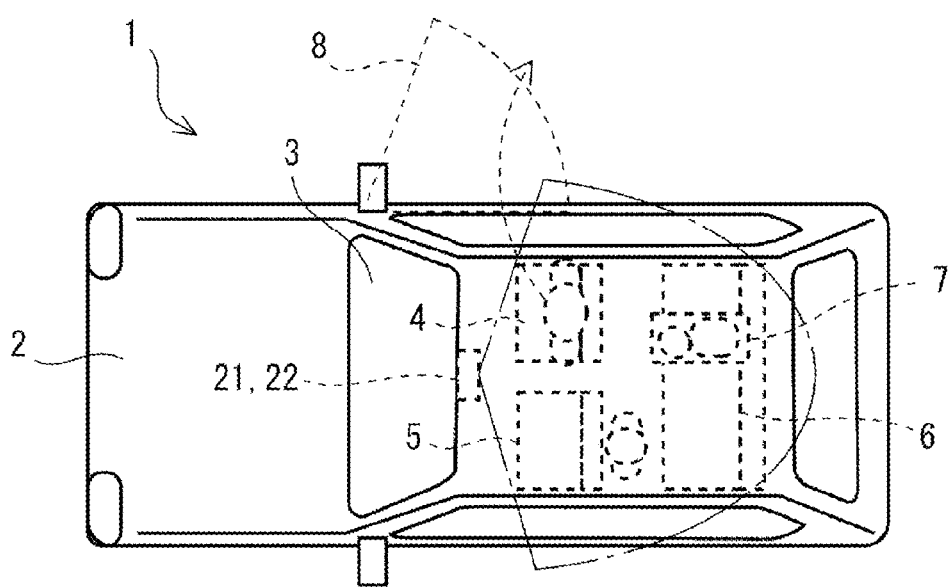
FIG. 2 illustrates a state in which plural occupants are seated in the automobile illustrated in FIG. 1.

FIG. 2 illustrates a state in which plural occupants are seated in the automobile 1 illustrated in FIG. 1.

An adult as the driver sits in the driver's seat 4. A child sits in the rear seat 6. An infant sits in the infant car seat 7 fixed on the rear seat 6.

In this manner, the automobile 1 can run while accommodating plural occupants.

After the driver stops driving the automobile 1, it opens the right front door 8, gets out of the automobile 1, and closes the right front door 8. If the driver gets out of the automobile 1 alone, a child including an infant is left in the automobile 1. Hereinafter, a child including an infant will be simply called a child.

To take measures against leaving a child in the automobile 1 alone, the opening/closing history of the doors of the automobile 1 may be recorded, and if the opening/closing history is recorded, an alert may be output when an occupant leaves the automobile 1.

However, there may be a case in which an occupant merely places his/her belongings in the automobile 1, and if an alert is output merely based on the opening/closing history of the doors, an alert is output when an occupant has opened a door, such as the rear gate 12, placed his/her belongings, and closed the door.

In this manner, while the above-described approach to outputting an alert based on the opening/closing history of the doors is meaningful in terms of the safety of a child who may have been left in the automobile 1 alone, an occupant using the automobile 1 may find this approach inconvenient and slightly excessive.

To address this issue, the following measures may be taken instead of using the opening/closing history of the doors of the automobile 1. An image of the inside of the automobile 1 before a door is opened and closed and that after the door is opened and closed are taken with an internal-environment camera 22. The two images of the inside of the automobile 1 are then compared with each other, and if a child is found to be left in the automobile 1 alone, an alert is output.

Some children are physically small. Such a small child in the automobile 1 may enter a blind spot, such as the back of a seat or between seats, and an image of the child may not be properly taken. With the approach to detecting a child based on images of the inside of the automobile 1, a child may not always be detected properly.

There is still a room for improvement in outputting an alert about an occupant being left in the automobile 1.

Figure 3:
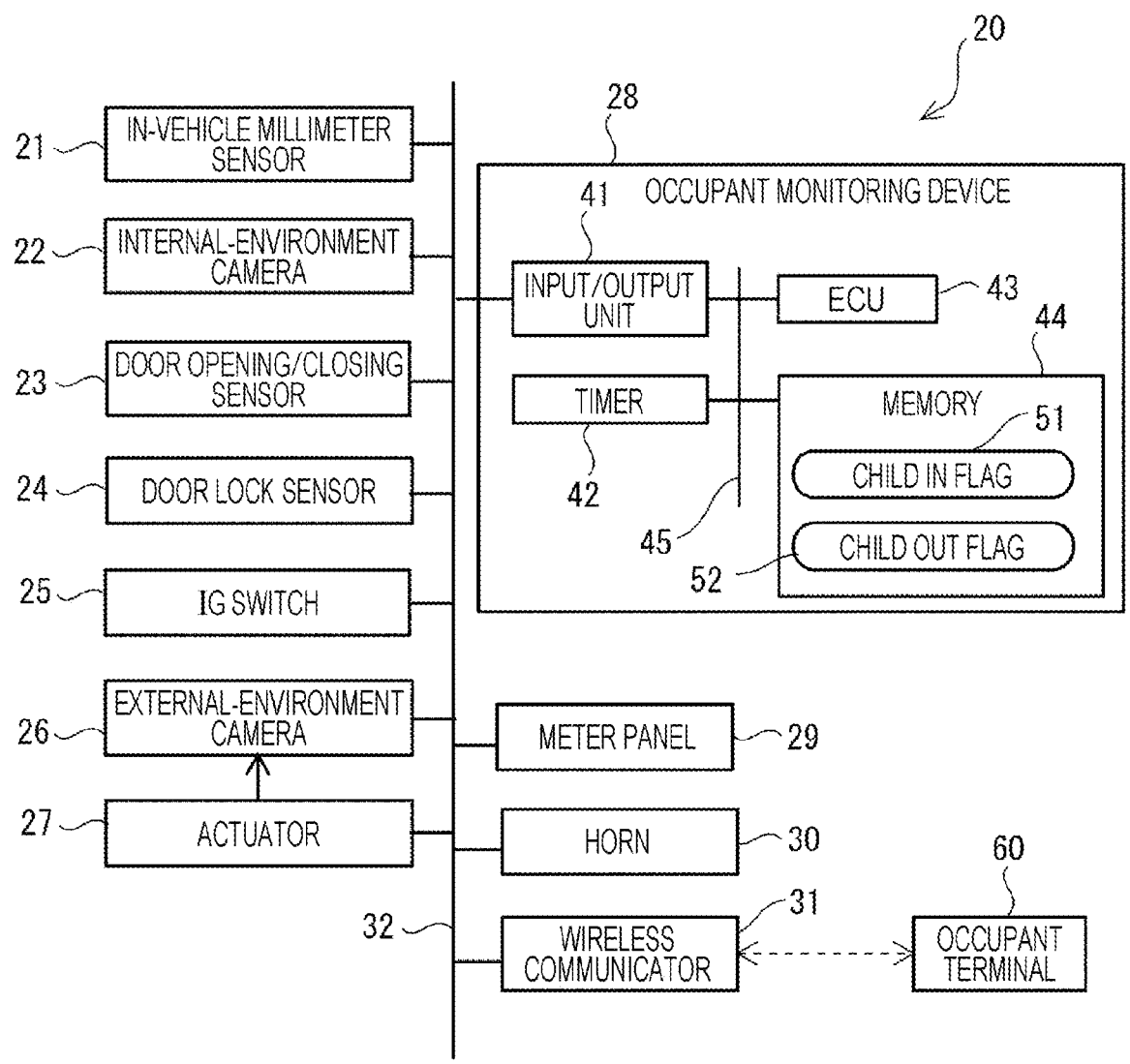
FIG. 3 is a block diagram of the alert system for the automobile illustrated in FIG. 1.

FIG. 3 is a block diagram of the alert system 20 for the automobile 1 illustrated in FIG. 1. The alert system 20 may be installed in the automobile 1 as part of a control system for the automobile 1.

The alert system 20 illustrated in FIG. 3 includes an in-vehicle millimeter sensor 21, an internal-environment camera 22, a door opening/closing sensor 23, a door lock sensor 24, an ignition (IG) switch 25, an external-environment camera 26, an actuator 27, an occupant monitoring device 28, a meter panel 29, a horn 30, a wireless communicator 31, and an in-vehicle network 32 to which these devices are coupled.

The in-vehicle network 32 may be a wired communication network for the automobile 1, such as a network based on a controller area network (CAN) or a local interconnect network (LIN). The in-vehicle network 32 may be a communication network, such as a local area network (LAN), or a combination of such a communication network and a wired communication network. The in-vehicle network 32 may partially include a wireless communication network. The above-described devices of the alert system 20 coupled to the in-vehicle network 32 can send and receive detection data and control data with each other via the in-vehicle network 32.

The in-vehicle millimeter sensor 21 is disposed on the front center portion of a roof in the compartment 3, as illustrated in FIG. 1. The in-vehicle millimeter sensor 21 outputs millimeter waves of a predetermined frequency within a range of 20 to 80 GHz, for example, to the compartment 3 and receives reflected waves. The period from when radio waves are output until reflected waves are returned, for example, is different depending on whether an occupant is left in the compartment 3. Using high-frequency millimeter waves, such as those of 40 GHz or higher, as detection waves can detect the body size and the motion of the chest of an occupant including a child in the compartment 3. For regular monitoring, the in-vehicle millimeter sensor 21 can thus suitably use millimeter waves of 60 GHz or higher, such as 75 GHz, to monitor occupants. Conversely, low-frequency millimeter waves of about 20 GHz, such as 24 GHz, used as detection waves are less vulnerable to obstacles, such as seats and metal partitions, in the compartment 3. To reduce blind spots in the compartment 3, low-frequency millimeter waves of about 20 GHz are also used.

In this manner, the in-vehicle millimeter sensor 21 outputs millimeter radio waves to the compartment 3 of the automobile 1 and detects millimeter waves reflected by an occupant. In one embodiment, the in-vehicle millimeter sensor 21 may serve as an "in-vehicle sensor" and detect an occupant in the automobile 1.

The internal-environment camera 22 is also an example of the in-vehicle sensor. A wide angle camera, for example, may be used as the internal-environment camera 22. The internal-environment camera 22 can thus image the entirety of the compartment 3 from the front side so as to image plural occupants, such as the driver and other occupants. The internal-environment camera 22 is disposed on the front center portion of the roof in the compartment 3, as illustrated in FIG. 1, or on a dashboard or a center console (neither is illustrated) located in front of the driver's seat 4 and the passenger seat 5.

In one embodiment, the internal-environment camera 22 may serve as an "in-vehicle sensor" and detect an occupant in the automobile 1.

The door opening/closing sensor 23 detects opening/closing of the doors including the rear gate 12 of the automobile 1. The door opening/closing sensor 23 may be provided for each of the doors of the automobile 1. The door opening/closing sensor 23 may detect that a closed door is opened and that an opened door is closed and output this information. The door opening/closing sensor 23 may be configured to detect how much a door is opened, such as the opening angle of a door.

The door opening/closing sensor 23 detects opening/closing of a door of the automobile 1, that is, detects an operation of the automobile 1 performed when an occupant gets in or out of the automobile 1. In one embodiment, the door opening/closing sensor 23 may serve as a "vehicle sensor". The door opening/closing sensor 23 can detect multiple operations of the automobile 1 which are performed every time an occupant gets in the automobile 1 or gets out of the automobile 1.

The door lock sensor 24 detects locking/unlocking of a door lock (not illustrated) of the automobile 1. The door lock may be provided for each door or for all the doors of the automobile 1. The door lock sensor 24 may detect that a locked door lock is unlocked and an unlocked door lock is locked and output this information.

The door lock sensor 24 may serve as a vehicle sensor which detects locking/unlocking of a door of the automobile 1, and can detect an operation of the automobile 1 performed when an occupant gets in or out of the automobile 1. The door lock sensor 24 can detect multiple operations of the automobile 1 which are performed every time an occupant gets in the automobile 1 or gets out of the automobile 1.

The ignition switch 25 is used for starting and stopping an engine or a motor, which is a power source for driving the automobile 1. When a power source is started, the automobile 1 is ready to run. When a power source is stopped, the automobile 1 stops running. In response to an operation performed by an occupant, such as a driver, the ignition switch 25 may output a start signal or a stop signal in accordance with the operation.

Figure 4:
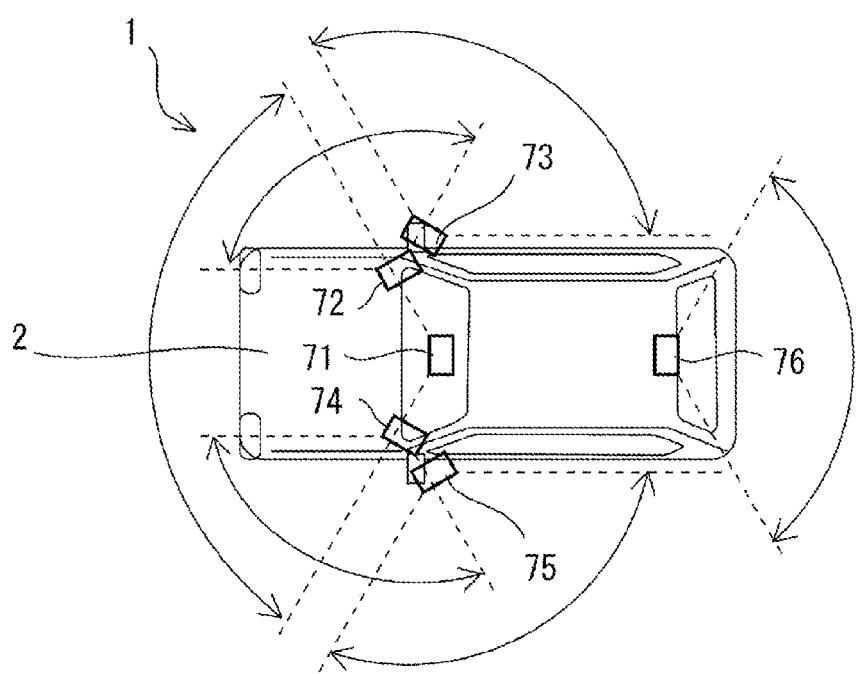
FIG. 4 is a plan view for explaining examples of multiple external-environment cameras provided in the automobile illustrated in FIG. 1 to image the outside of the automobile.

The external-environment camera 26 is used for imaging the outside of the automobile 1. Basically, plural external-environment cameras 26 may be provided, as illustrated in FIG. 4, to image the environment around the automobile 1 in action. Imaging the environment around the automobile 1 by 360 degrees with the plural external-environment cameras 26 can obtain information on the environment around the automobile 1 in action. The external-environment camera 26 can image an occupant outside the automobile 1.

The actuator 27 is used for adjusting the direction of the external-environment camera 26. If plural external-environment cameras 26 are provided in the automobile 1, plural actuators 27 may be provided so that they can be associated with the plural external-environment cameras 26 based on a one-on-one correspondence. The actuator 27 is provided in the automobile 1 to change the direction of the external-environment camera 26.

The meter panel 29 is disposed in front of the driver's seat 4 in the compartment 3 so that the driver can easily recognize information on the meter panel 29 during driving. An example of the meter panel 29 is a liquid crystal panel. On the meter panel 29, a screen to be checked during driving and a screen to be checked when the automobile 1 is stopped or parked are selectively displayed. An example of the screen to be displayed when the automobile 1 is stopped or parked is an alert screen for an occupant being left in the automobile 1.

The meter panel 29 may serve as an output unit provided in the automobile 1 and output an alert.

The horn 30 may output an alert or an alarm to another automobile 1 or a person around the automobile 1 including the alert system 20.

The horn 30 may serve as an output unit provided in the automobile 1 and output an alert.

The wireless communicator 31 establishes a wireless communication path with an occupant terminal 60 owned by an occupant, such as the driver, of the automobile 1 so as to send and receive communication data with the occupant terminal 60. The wireless communicator 31 may output an alert as status information of the automobile 1 to the occupant terminal 60. In response to an alert from the wireless communicator 31, the occupant terminal 60 may output sound or a screen to the occupant. The wireless communicator 31 may output an alert to the occupant terminal 60 after the occupant has left the automobile 1.

The occupant monitoring device 28 monitors occupants in the automobile 1. The occupant monitoring device 28 includes an input/output unit 41, a timer 42, an electronic control unit (ECU) 43, a memory 44, and an internal bus 45 to which these devices are coupled.

The input/output unit 41 is coupled to the in-vehicle network 32. The input/output unit 41 sends and receives data to and from individual elements of the automobile 1 via the in-vehicle network 32.

The timer 42 measures various times including the clock time. The timer 42 may measure the timing at which millimeter waves for detecting an occupant is output and the time elapsed from when millimeter waves are output.

The memory 44 stores a program to be executed by the ECU 43 and data. The memory 44 may be constituted by a volatile memory, such as a random access memory (RAM), and a non-volatile memory, such as a solid state drive (SSD) or a hard disk drive (HDD).

As illustrated in FIG. 3, the memory 44 stores a child IN flag 51 and a child OUT flag 52 for recording a history of the IN/OUT state of a child as an occupant in the automobile 1.

The child IN flag 51 may increment its count value when it is found that a child has got in the automobile 1, for example, based on the detection result that a door is opened and closed and based on images captured by the external-environment camera 26.

The child OUT flag 52 may increment its count value when it is found that a child has got out of the automobile 1, for example, based on the detection result that a door is opened and closed and based on images captured by the external-environment camera 26.

When all the children having got in the automobile 1 have got out of the automobile 1, the count value of the child IN flag 51 and that of the child OUT flag 52 become equal to each other. If the count value of the child IN flag 51 and that of the child OUT flag 52 are different, it means that a child is still in the automobile 1.

When an occupant has checked that no children are left in the automobile 1, he/she may reset and initialize the count value of the child IN flag 51 and that of the child OUT flag 52 to 0.

The count value of the child IN flag 51 may be incremented when it is found that a child has got in the automobile 1, while that of the child OUT flag 52 may be incremented when it is found that a child has got out of the automobile 1.

The ECU 43 is a central processing unit (CPU) used in a computer, for example. As a result of reading a program from the memory 44 and executing it, the ECU 43 serves as a controller that centrally controls the operation of the occupant monitoring device 28.

The ECU 43, which serves as the controller for the occupant monitoring device 28, identifies an occupant in the automobile 1 and also monitors the state of the occupant, such as whether he/she is falling asleep, based on an image captured by the internal-environment camera 22 and the motion of the chest of the occupant detected by the in-vehicle millimeter sensor 21. When identifying and monitoring an occupant in the automobile 1, the ECU 43 instructs the in-vehicle millimeter sensor 21 to output millimeter waves of 60 GHz.

In the first embodiment, the ECU 43, which serves as the controller for the occupant monitoring device 28, determines whether a child is likely to have been left in the automobile 1 alone, based on the detection results of an occupant in the automobile 1 obtained by the internal-environment camera 22 and the in-vehicle millimeter sensor 21. If it is found that a child is likely to have been left in the automobile 1 alone, the ECU 43 outputs an alert. If it is determined that no child is likely to have been left in the automobile 1 alone, the ECU 43 does not output an alert.

In one embodiment, the ECU 43 may serve as a "determiner" and an "alert controller".

To predict and determine whether a child is likely to have been left in the automobile 1 alone, the ECU 43, which serves as the determiner, may also use information whether there is a change in the presence/absence state of a person or an object outside the automobile 1 in images captured by the external-environment camera 26, in addition to the detection results obtained by the internal-environment camera 22 and the in-vehicle millimeter sensor 21.

FIG. 4 is a plan view for explaining examples of multiple external-environment cameras 26 provided in the automobile 1 illustrated in FIG. 1 to image the outside of the automobile 1.

In FIG. 4, as the multiple external-environment cameras 26, an external-environment front camera 71, an external-environment right front camera 72, an external-environment right rear camera 73, an external-environment left front camera 74, an external-environment left rear camera 75, and an external-environment rear camera 76 are illustrated.

Multiple external-environment cameras 26 are installed in the automobile 1 to image the environment around the automobile 1 during autonomous driving or driving using a driving assist function and to enhance the safety of the automobile 1 to avoid collision during manual driving.

In the automobile 1, a 360-degree camera installed on the roof outside the automobile 1 may be used as the external-environment camera 26.

The external-environment front camera 71 is disposed in the front portion of the automobile 1 while facing frontward. In FIG. 4, the external-environment front camera 71 is located in the compartment 3 at the center portion of the front edge of the roof of the automobile 1. The external-environment front camera 71 images a range in front of the automobile 1, for example.

The external-environment right front camera 72 is disposed on the right side of the automobile 1 while facing frontward. In FIG. 4, the external-environment right front camera 72 is located in the compartment 3 at the right edge of the dashboard of the automobile 1, for example. The external-environment right front camera 72 images a range from the right front side to the right side of the automobile 1, for example. The external-environment right front camera 72 may be disposed on the right front door 8 or on a side view mirror.

The external-environment right rear camera 73 is disposed on the right side of the automobile 1 while facing backward. In FIG. 4, the external-environment right rear camera 73 is located on the right front door 8 or on a side-view mirror. The right front door 8 can be opened and closed. In one embodiment, the right front door 8 may serve as an "exterior member". The external-environment right rear camera 73 images a range from the right side to the right rear side of the automobile 1, for example.

The external-environment left front camera 74 is disposed on the left side of the automobile 1 while facing frontward. In FIG. 4, the external-environment left front camera 74 is located in the compartment 3 at the left edge of the dashboard of the automobile 1, for example. The external-environment left front camera 74 images a range from the left front side to the left side of the automobile 1, for example. The external-environment left front camera 74 may be disposed on the left front door 9 or on a side view mirror.

The external-environment left rear camera 75 is disposed on the left side of the automobile 1 while facing backward. In FIG. 4, the external-environment left rear camera 75 is located on the left front door 9 or on a side-view mirror. The left front door 9 can be opened and closed. In one embodiment, the left front door 9 may serve as an "exterior member". The external-environment left rear camera 75 images a range from the left side to the left rear side of the automobile 1.

The external-environment rear camera 76 is disposed at the rear side of the automobile 1 while facing backward. In FIG. 4, the external-environment rear camera 76 is located at the top center portion of the rear gate 12. The rear gate 12 can be opened and closed. In one example, the rear gate 12 may serve as an "exterior member". The external-environment rear camera 76 images a range of the back side of the automobile 1.

A group of the multiple external-environment cameras 26 in FIG. 4 can image a 360-degree area around the automobile 1 in a distributed manner. When the control system of the automobile 1 has predicted collision or lane departure of the automobile 1 based on images captured by the multiple external-environment cameras 26, it can execute driving control for preventing collision or lane departure.

Figure 5:
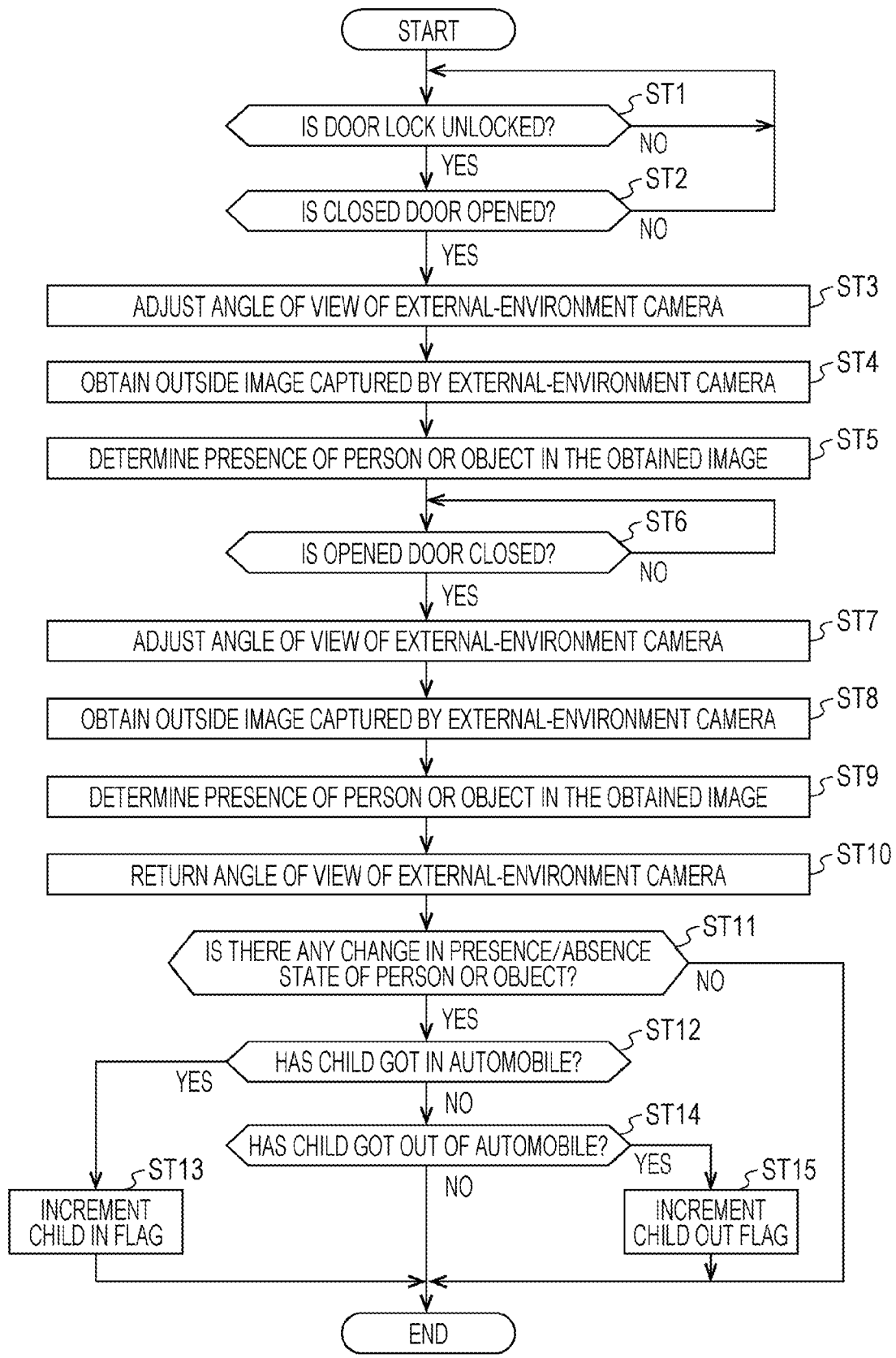
FIG. 5 is a flowchart illustrating occupant IN/OUT monitoring control executed by the alert system.

FIG. 5 is a flowchart illustrating occupant IN/OUT monitoring control executed by the alert system 20.

The ECU 43 of the occupant monitoring device 28 may repeatedly execute this occupant IN/OUT monitoring control illustrated in FIG. 5.

Vehicle sensors used in the first embodiment, such as the door opening/closing sensor 23 and the door lock senor 24, are capable of detecting multiple operations of the automobile 1 which are performed every time an occupant gets in the automobile 1 or gets out of the automobile 1.

In step ST1, the ECU 43 determines whether a locked door lock is unlocked, based on the detection result of the door lock sensor 24. If a locked door lock is not unlocked, the ECU 43 repeats step ST1. If a locked door lock is unlocked, the ECU 43 proceeds to step ST2.

In step ST2, the ECU 43 determines whether any of the closed doors including the rear gate 12 of the automobile 1 is opened, based on the detection result of the door opening/closing sensor 23. If none of the closed doors are opened, the ECU 43 returns to step ST1. If any of the closed doors is opened, the ECU 43 proceeds to step ST3.

In step ST3, the ECU 43 causes the actuator 27 to adjust the angle of view of the external-environment camera 26 that is capable of imaging an occupant getting in the automobile 1 from the opened door. The ECU 43 performs control to adjust the angle of view of the external-environment camera 26 so that the external-environment camera 26 can image a child getting in the automobile 1 from the opened door by himself/herself. In this case, the ECU 43 performs control so that the external-environment camera 26 can capture an image by including the road surface near the body 2 of the automobile 1. Specific examples of the adjustment of the angle of view by the external-environment camera 26 will be discussed later. In one example, the ECU 43 may select one of the multiple external-environment cameras 26 illustrated in FIG. 4 that is able to image a child getting in the automobile 1 by himself/herself, based on the positional relationship of each of the external-environment cameras 26 with the opened door, and perform control to adjust the angle of view of the selected external-environment camera 26.

If the external-environment camera 26 is able to image the child getting in the automobile 1 by himself/herself at the current angle of view, the ECU 43 does not perform control to adjust the angle of view in step ST3.

In step ST4, the ECU 43 obtains the outside image captured by the external-environment camera 26 subjected to processing in step ST3. The ECU 43 may record the obtained outside image in the memory 44.

In step ST5, the ECU 43 analyzes the image obtained in step ST4 to determine the presence of a person or an object included in the image. If plural persons are included in the image, the ECU 43 may determine the presence of these persons. The ECU 43 may record information on a child or children in the image in the memory 44.

In step ST6, the ECU 43 determines whether the opened door including the rear gate 12 is closed, based on the detection result of the door opening/closing sensor 23. If the opened door is not closed, the ECU 43 repeats step ST6. If the opened door is closed, the ECU 43 proceeds to step ST7.

In step ST7, the ECU 43 causes the actuator 27 to adjust the angle of view of the external-environment camera 26 that is capable of imaging the occupant who may have got in the automobile 1 from the currently closed door. For example, the ECU 43 performs control to adjust the angle of view of the external-environment camera 26 so that the external-environment camera 26 can image the outside of the automobile 1 by including the road surface near the body 2 of the automobile 1 after the child has got in the automobile 1 from the closed door. Specific examples of the control operation of the angle of view performed by the external-environment camera 26 will be discussed later. In one example, the ECU 43 may select one of the multiple external-environment cameras 26 illustrated in FIG. 4 that is able to image the outside of the automobile 1 after the child has got in the automobile 1 from the closed door, based on the positional relationship of each of the external-environment cameras 26 with the closed door, and perform control to adjust the angle of view of the selected external-environment camera 26.

If the external-environment camera 26 is already able to image the outside of the automobile 1 after the child has got in the automobile 1 from the closed door because it is subjected to processing in step ST3, for example, the ECU 43 does not perform control to adjust the angle of view in step ST7.

In step ST8, the ECU 43 obtains the outside image captured by the external-environment camera 26 subjected to processing in step ST7. The ECU 43 may record the obtained outside image in the memory 44.

In step ST9, the ECU 43 analyzes the image obtained in step ST8 to determine the presence of a person or an object included in the image. If plural persons are included in the image, the ECU 43 may determine the presence of these persons. The ECU 43 may record information on a child or children in the image in the memory 44.

In step ST10, the ECU 43 causes the actuator 27 to return the angle of view of the external-environment camera 26 adjusted in step ST3 and/or step ST7 to the angle before the control processing is started. This enables the external-environment camera 26 to restart imaging the environment around the running automobile 1.

In step ST11, the ECU 43 compares the occupant or object determined in step ST5 and that in determined in step ST9 with each other and determines whether there is any change in the presence/absence state of an occupant or an object outside the automobile 1. If there is no change in the presence/absence state of an occupant or an object outside the automobile 1 in the images, the ECU 43 determines that nobody has got in the automobile 1 even if the door is opened and closed, and terminates the control processing. If there is a change in the presence/absence state of an occupant or an object outside the automobile 1 in the images, the ECU 43 proceeds to step ST12.

If the image outside the automobile 1 obtained in step ST4 and that in step ST8 have been captured at the same angle of view, the ECU 43 may directly compare the images and check for a difference in image components to determine whether there is a change in the presence/absence state of an occupant or an object outside the automobile 1. In the first embodiment, however, the angle of view can be controlled independently in steps ST3 and ST7 before the corresponding images are taken. It is thus desirable to compare a person or an object included in the images and determine whether there is any change in the presence/absence state of an occupant or an object outside the automobile 1, instead of directly comparing the captured images.

In step ST12, the ECU 43 determines whether a change in the presence/absence state of an occupant or an object outside the automobile 1 includes a change due to a child having got in the automobile 1. If such a change is found, the ECU 43 proceeds to step ST13.

In step ST13, the ECU 43 increments the count value of the child IN flag 51 recorded in the memory 44 by the number of children having got in the automobile 1. In this manner, the count value of the child IN flag 51 is changed when the ECU 43 has determined that a child has got in the automobile 1, based on the images captured by the external-environment camera 26. The ECU 43 then completes the control processing.

In step ST14, the ECU 43 determines whether a change in the presence/absence state of an occupant or an object outside the automobile 1 includes a change due to a child having got out of the automobile 1. If such a change is found, the ECU 43 proceeds to step ST15. If a change due to a child having got out of the automobile 1 is not found, the ECU 43 terminates the control processing.

In step ST15, the ECU 43 increments the count value of the child OUT flag 52 recorded in the memory 44 by the number of children having got out of the automobile 1. In this manner, the count value of the child OUT flag 52 is changed when the ECU 43 has determined that a child has got out of the automobile 1, based on the images captured by the external-environment camera 26. The ECU 43 then completes the control processing.

The ECU 43 may alternatively decrement the count value of the child IN flag 51 recorded in the memory 44 by the number of children having got out of the automobile 1.

As described above, every time the door lock sensor 24 or the door opening/closing sensor 23, which may serve as a vehicle sensor, has detected an operation of the automobile 1, the ECU 43, which may serve as the determiner, can determine the presence or the absence of a child outside the automobile 1, based on an outside image obtained by the external-environment camera 26. Among plural outside images captured by the external-environment camera 26 when an occupant has got in or got out of the automobile 1 one time, if an image with a child outside the automobile 1 is changed to an image without a child, the ECU 43 can predict and determine that a child has got in the automobile 1. If an image without a child outside the automobile 1 is changed to an image with a child, the ECU 43 can predict and determine that a child has got out of the automobile 1. That is, based on a change in the presence/absence state of a child outside the automobile 1 in multiple images that are captured by the external-environment camera 26 when an occupant has got in or got out of the automobile 1 one time, the ECU 43 can predict and determine that a child has got in or got out of the automobile 1.

To make this determination, the ECU 43 changes the angle of view of the external-environment camera 26 by using the actuator 27, and based on multiple images captured by the external-environment camera 26 with the changed angle of view, the ECU 43 can predict and determine the presence or the absence of a physically small child outside the automobile 1.

Figure 6:
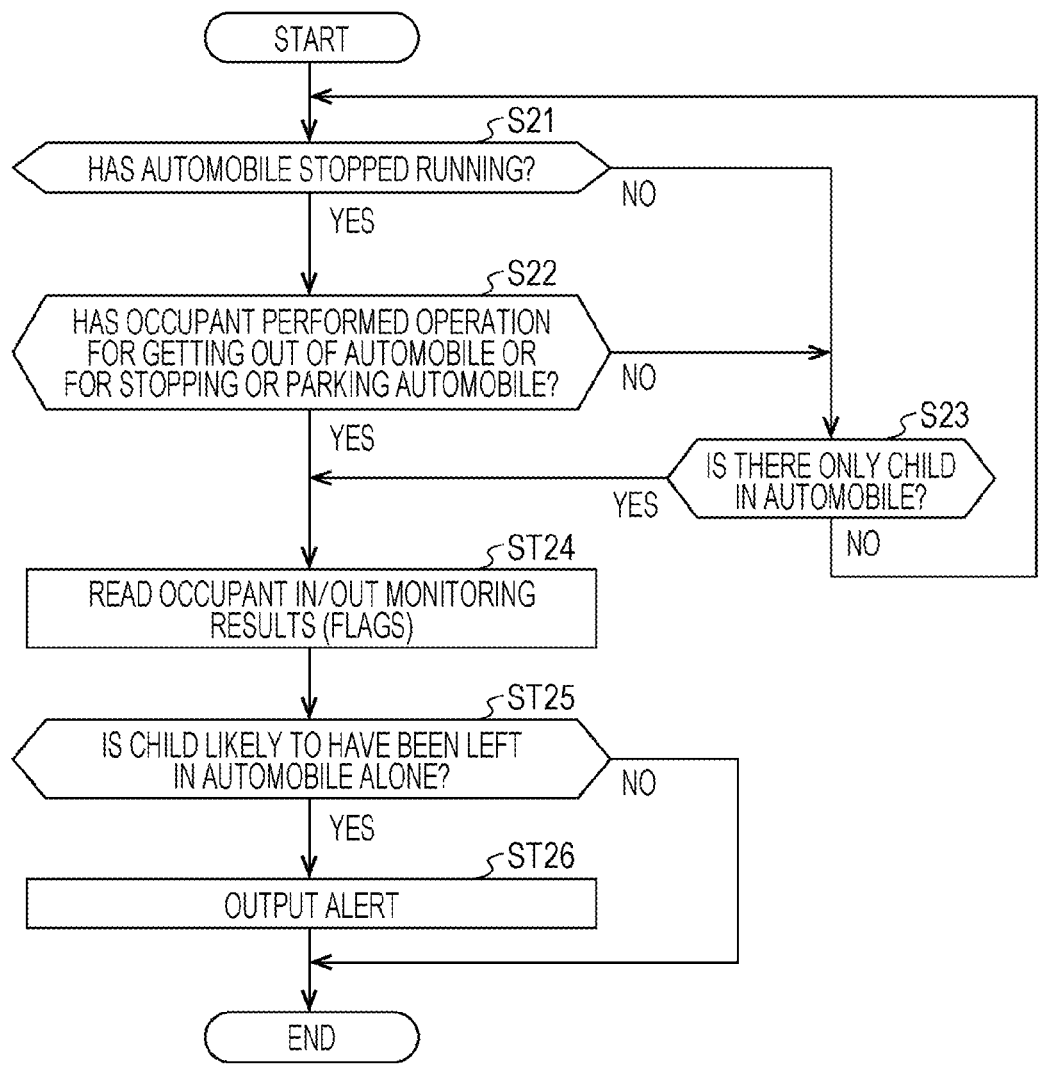
FIG. 6 is a flowchart illustrating control processing executed by the alert system of the embodiment to determine whether a child is left in the automobile.

FIG. 6 is a flowchart illustrating control processing executed by the alert system 20 of the first embodiment to determine whether a child is left in the automobile 1.

The ECU 43 of the occupant monitoring device 28 of the automobile 1 may repeatedly execute this control processing illustrated in FIG. 6.

In ST21, the ECU 43 determines whether the automobile 1 has stopped running. For example, the ECU 43 makes this determination according to whether the automobile 1 has come to a stop or whether the ignition switch 25 is turned OFF. If the automobile 1 has stopped running, the ECU 43 proceeds to step ST22. If the automobile 1 has not stopped running, the ECU 43 proceeds to step ST23.

In step ST22, the ECU 43 determines whether an occupant has performed a certain operation for getting out of the automobile 1. The ECU 43 may also determine whether an occupant has performed a certain operation for stopping or parking the automobile 1. To get out of the automobile 1, an occupant switches OFF the ignition switch 25 and opens and closes the door, for example. If it is found that the occupant has performed such an operation, the ECU 43 proceeds to step ST24. If it is not found that the occupant has performed such an operation, the ECU 43 proceeds to step S23.

In step ST23, the ECU 43 determines whether there is only a child in the automobile 1. The ECU 43 compares the child IN flag 51 and the child OUT flag 52 with each other. If the count value of the child IN flag 51 is greater than that of the child OUT flag 52, the ECU 43 can determine that only a child is in the automobile 1. The ECU 43 may also obtain and analyze an image currently captured by the internal-environment camera 22 and then determine whether an adult is in the automobile 1. Based on the above-described items of information, the ECU 43 determines whether only a child is in the automobile 1. If it is not found that only a child is in the automobile 1, the ECU 43 returns to step ST21 and repeats steps ST21 through ST23. If it is found that only a child is in the automobile 1, the ECU 43 proceeds to step ST24.

In step ST24, the ECU 43 reads the child IN flag 51 and the child OUT flag 52, which serve as occupant IN/OUT monitoring results updated by the occupant IN/OUT monitoring control illustrated in FIG. 5, from the memory 44.

In step ST25, the ECU 43 determines whether a child is likely to have been left in the automobile 1 alone, based on the occupant IN/OUT monitoring results obtained in step ST24. If the count value of the child IN flag 51 is greater than that of the count OFF flag 52, the ECU 43 determines that a child is likely to have been left in the automobile 1 alone and proceeds to step ST26. If the count value of the child IN flag 51 is not greater than that of the count OFF flag 52, the ECU 43 determines that no child is likely to have been left in the automobile 1 alone and terminates the control processing.

In this manner, the ECU 43, which may serve as the determiner, can predict and determine whether a child is likely to have been left in the automobile 1 alone, based on a change in the presence/absence state of a person or an object outside the automobile 1 in images captured by the external-environment camera 26.

Even if it is not possible to determine whether a child is left in the automobile 1 based on the detection results of the internal-environment camera 22 or the in-vehicle millimeter sensor 21, which serves as an in-vehicle sensor, the ECU 43 can still predict and determine whether a child is likely to have been left in the automobile 1 alone, based on a change in the presence/absence state of a person or an object outside the automobile 1 in images captured by the external-environment camera 26.

If the child IN flag 51 recorded in the memory 44 is decremented by the number of children having got out of the automobile 1 in step ST15 in FIG. 5, the ECU 43 may simply read the child IN flag 51 in step ST24 and determine in step ST25 whether a child is likely to have been left in the automobile 1 according to whether the count value of the child IN flag 51 is 0. If the count value of the child IN flag 51 is 0, it means that all the children have got out of the automobile 1.

In step ST26, the ECU 43 outputs an alert to inform that a child is likely to have been left in the automobile 1 alone.

As described above, if the automobile 1 has stopped driving and if an operation for stopping or parking the automobile 1 is performed or an operation for getting out of the automobile 1 is performed, or if only a child is in the automobile 1, the ECU 43, which serves as the determiner, predicts and determines whether a child is likely to have been left in the automobile 1 alone.

To make this determination based on a change in the presence/absence state of a person or an object outside the automobile 1 in images captured by the external-environment camera 26, the ECU 43 refers to the count values of flags, such as the child IN flag 51 and the child OUT flag 52.

Even if it is determined from the results of detecting occupants in the automobile 1 by an in-vehicle sensor that no child is left in the automobile 1, the ECU 43 can predict and determine that a child is left in the automobile 1 based on the count values of the child IN flag 51 and the child OUT flag 52.

If it is determined from the count values of the child IN flag 51 and the child OUT flag 52 that no child is left in the automobile 1, the ECU 43, which may serve as an alert controller, does not output an alert.

Figure 7:
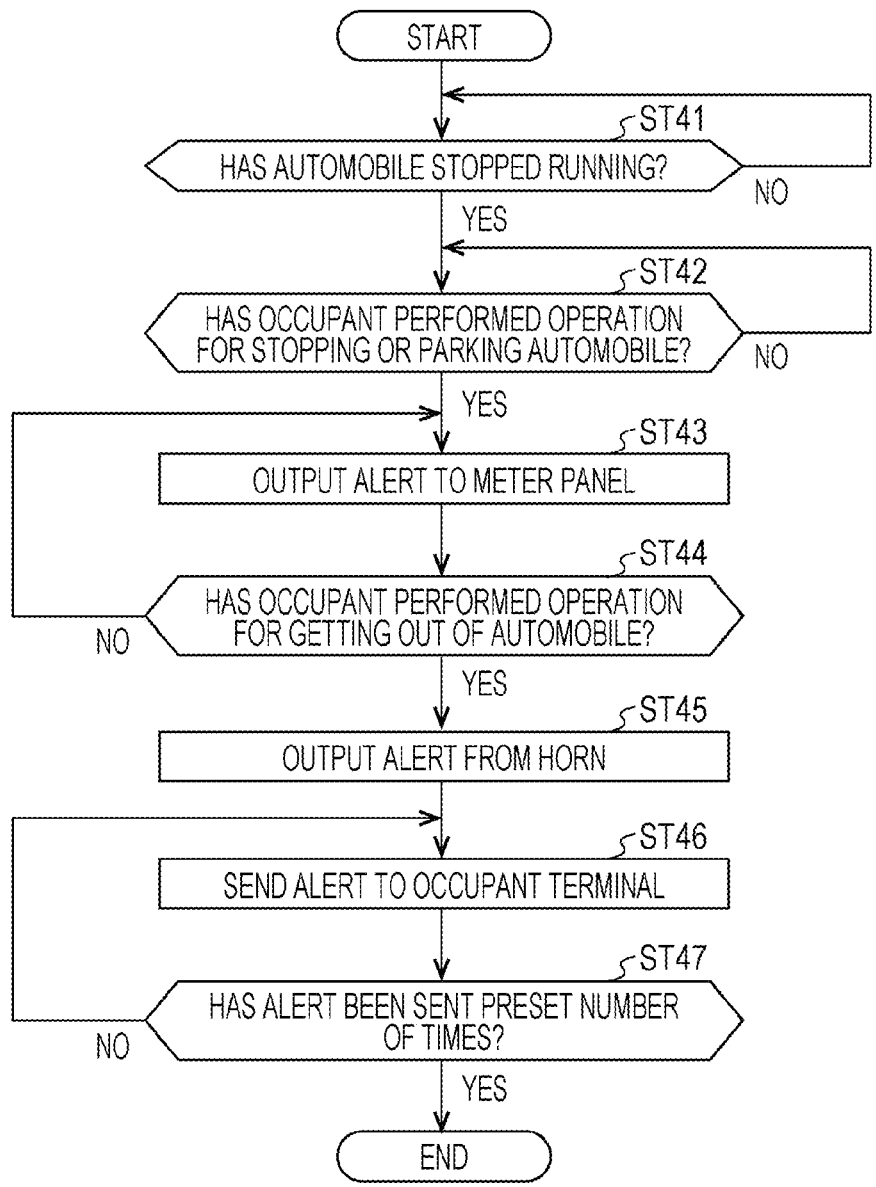
FIG. 7 is a flowchart illustrating alert output control processing executed by the alert system.

FIG. 7 is a flowchart illustrating alert output control processing executed by the alert system 20.

The ECU 43 of the occupant monitoring device 28 of the automobile 1 may repeatedly execute this alert output control processing in FIG. 7. The ECU 43 may repeat this control processing as step ST26 in FIG. 6.

In ST41, the ECU 43 determines whether the automobile 1 has stopped running. Step ST41 may be the same as step ST21 in FIG. 6. If the automobile 1 has not stopped running, the ECU 43 repeats step ST41. If the automobile 1 has stopped running, the ECU 43 proceeds to step ST42.

In step ST42, the ECU 43 determines whether an occupant has performed a certain operation for stopping or parking the automobile 1. To get out of the automobile 1, an occupant switches OFF the ignition switch 25, for example. If it is not found that the occupant has performed such an operation, the ECU 43 repeats step ST42. If it is found that the occupant has performed such an operation, the ECU 43 proceeds to step ST43.

In step ST43, the ECU 43 outputs an alert by displaying information on the meter panel 29 in front of the driver. Then, an occupant in the automobile 1 can visually recognize the alert output to an output unit, such as the meter panel 29, provided in the automobile 1.

In step ST44, the ECU 43 determines whether an occupant has performed a certain operation for getting out of the automobile 1. To get out of the automobile 1, an occupant opens and closes the door and locks the door lock. If such an operation is detected by the door opening/closing sensor 23 and the door lock sensor 24, the ECU 43 determines that an occupant has performed an operation for getting out of the automobile 1 and proceeds to step ST45. If such an operation is not performed, the ECU 43 returns to step ST43 and continues outputting an alert to the meter panel 29.

In step ST45, the ECU 43 outputs an alert sound from the horn 30. Then, an occupant having got out of the automobile 1 can hear the alert sound output from an output unit, such as the horn 30, provided in the automobile 1 if he/she is still near the automobile 1.

In step ST46, the ECU 43 sends an alert from the wireless communicator 31 disposed in the automobile 1 to the occupant terminal 60. The occupant terminal 60 then outputs the alert received from the wireless communicator 31. Then, the occupant having got out of the automobile 1 can receive the alert even if he/she is not near the automobile 1.

In step ST47, the ECU 43 checks whether the alert has already been sent to the occupant terminal 60 a preset number of times, three times, for example. If the alert has not been sent the preset number of times, the ECU 43 returns to step ST46 and repeats steps ST46 and ST47 until the alert is sent to the occupant terminal 60 the preset number of times. When the alert has been sent to the occupant terminal 60 the preset number of times, the ECU 43 completes this alert output control processing.

Specific examples of the adjustment of the angle of view of the external-environment camera 26 in the occupant IN/OUT monitoring control in FIG. 5 will be discussed below.

Figure 8:
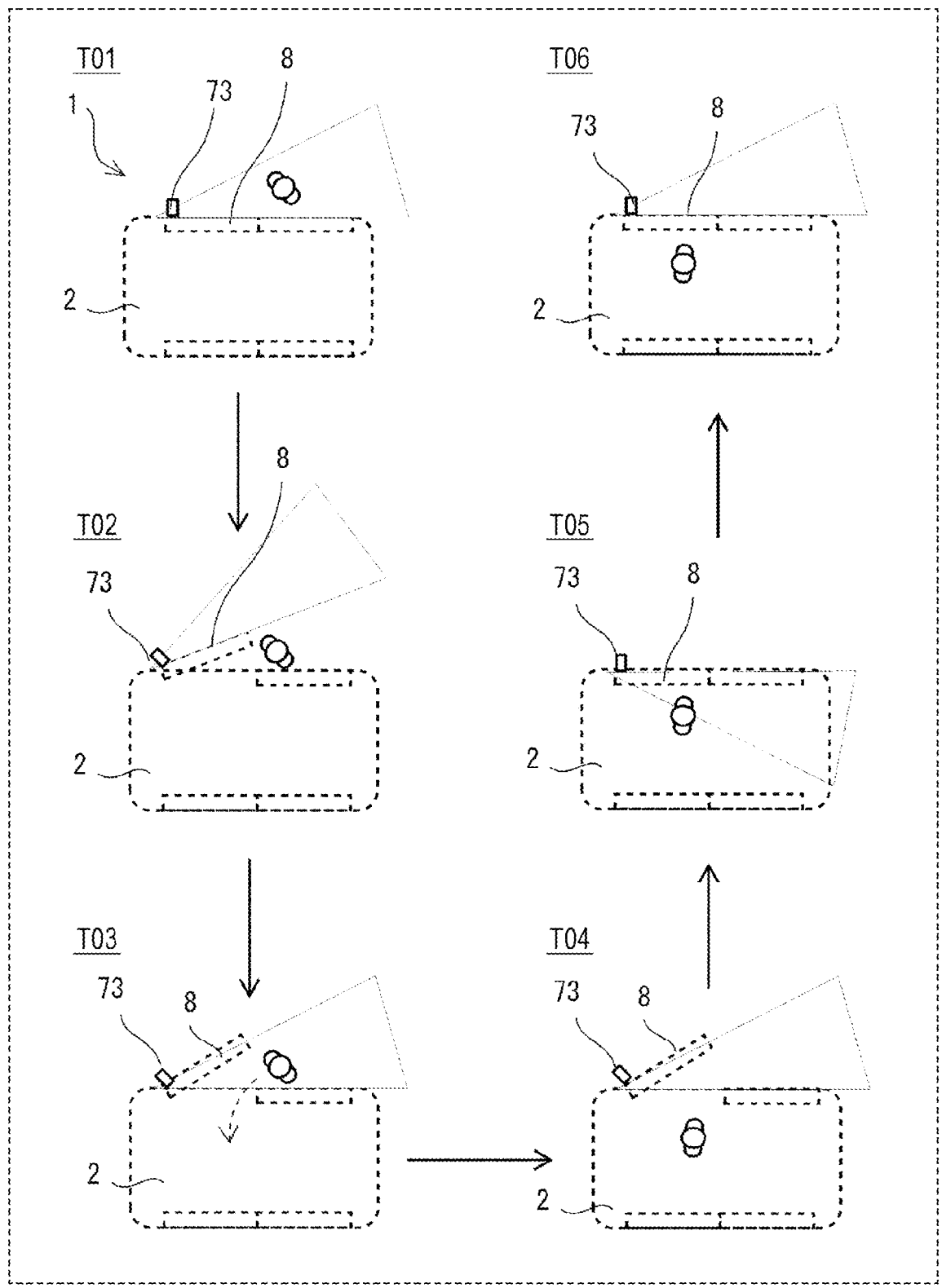
FIG. 8 illustrates plan views for explaining an example of the plane-direction adjustment of the angle of view of an external-environment right rear camera, which serves as an external-environment camera, disposed on a right front door of the automobile in FIG. 4.

FIG. 8 illustrates plan views for explaining an example of the plane-direction adjustment of the angle of view of the external-environment right rear camera 73, which serves as an external-environment camera 26, disposed on the right front door 8 in FIG. 4.

In FIG. 8, a physically small child is standing at the back of the right front door 8 outside the automobile 1 and is getting in the automobile 1 to sit in the driver's seat 4.

In FIG. 8, the states of the child at timings T01 through T06 from when the child is standing near the automobile 1 until he/she gets in the automobile 1 are illustrated.

At timing T01, the angle of view of the external-environment right rear camera 73 disposed on the right front door 8 is set in the regular angle to image the right rear side, which is farther backward than the right side, of the automobile 1. This enables the external-environment right rear camera 73 to image another automobile 1 located on the right side of the automobile 1 and another one approaching from the right rear side of the automobile 1.

At timing T02, the child is opening the right front door 8. The imaging range of the external-environment right rear camera 73 installed on the opened right front door 8 is changed so that the external-environment right rear camera 73 images the right backward area of the right front door 8. The child located at a position closer the automobile 1 than the rear end of the right front door 8 is not included in the imaging range of the external-environment right rear camera 73.

At timing T03, the ECU 43 thus executes step ST3 in FIG. 5 to adjust the angle of view of the external-environment right rear camera 73, which serves as an external-environment camera 26. The ECU 43 adjusts the angle of view of the external-environment right rear camera 73 to face the right front door 8. Then, the child located closer to the automobile 1 than the rear end of the right front door 8 can be imaged through the window glass of the right front door 8.

Then, at timing T04, the child gets in the automobile 1 from the opened right front door 8 and sits in the driver's seat 4.

At timing T05, the child having got in the automobile 1 closes the right front door 8.

At timing T06, the ECU 43 executes step ST7 in FIG. 5 to readjust the angle of view of the external-environment right rear camera 73, which serves as an external-environment camera 26. The ECU 43 adjusts the angle of view of the external-environment right rear camera 73 to image the right backward area of the right front door 8. Then, the child in the automobile 1 is not imaged by the external-environment right rear camera 73.

As a result of executing step ST4 in FIG. 5, the ECU 43 obtains the image captured by the external-environment right rear camera 73 at the angle of view set at timing T03. As a result of executing step ST8 in FIG. 5, the ECU 43 obtains the image captured by the external-environment right rear camera 73 at the angle of view set at timing T06.

The outside image obtained in step ST4 includes the child, but the outside image obtained in step ST8 does not include the child. The ECU 43 determines in step ST11 in FIG. 5 that there is a change in the presence/absence state of a person outside the automobile 1. The ECU 43 determines in step ST12 that a child has got in the automobile 1 and then increments the count value of the child IN flag 51 by one in step ST13.

When the child sitting in the driver's seat 4 is getting out of the automobile 1, the order of timings T01 through T06 illustrated in FIG. 8 is reversed. In this case, the ECU 43 increments the count value of the child OUT flag 52 in step ST15 in FIG. 5. In this manner, when a child has got in the automobile 1, the count value of the child IN flag 51 is incremented by one, and, when this child has got out of the automobile 1, the count value of the child OUT flag 52 is incremented by one. In this state, the count value of the child IN flag 51 and that of the child OUT flag 52 become equal to each other, and the ECU 43 determines in step ST25 in FIG. 6 that no child is left in the automobile 1. In this case, the ECU 43 does not execute step ST26, that is, an alert is not output.

In contrast, if the child in the driver's seat 4 has not got out of the automobile 1, the ECU 43 does not execute step ST15 in FIG. 5, that is, the count value of the child OUT flag 52 is not incremented. In this state, the count value of the child IN flag 51 and that of the child OUT flag 52 do not match each other, and the ECU 43 determines in step ST25 in FIG. 6 that a child is likely to have been left in the automobile 1 alone. In this case, the ECU 43 executes step ST26, that is, an alert is output.

As described above, the ECU 43 changes the direction of the external-environment right rear camera 73 toward the backward side by using the actuator 27 and then causes the external-environment right rear camera 73 to capture images. Based on multiple images captured by the external-environment right rear camera 73 at the changed angle of view, the ECU 43 can predict and determine the presence or the absence of a physically small child. The external-environment right rear camera 73 can capture images by including the road surface near the body 2 of the automobile 1. Hence, if a physically small child is standing outside the automobile 1, the external-environment right rear camera 73 can still image at least the feet of this child.

Figure 9:
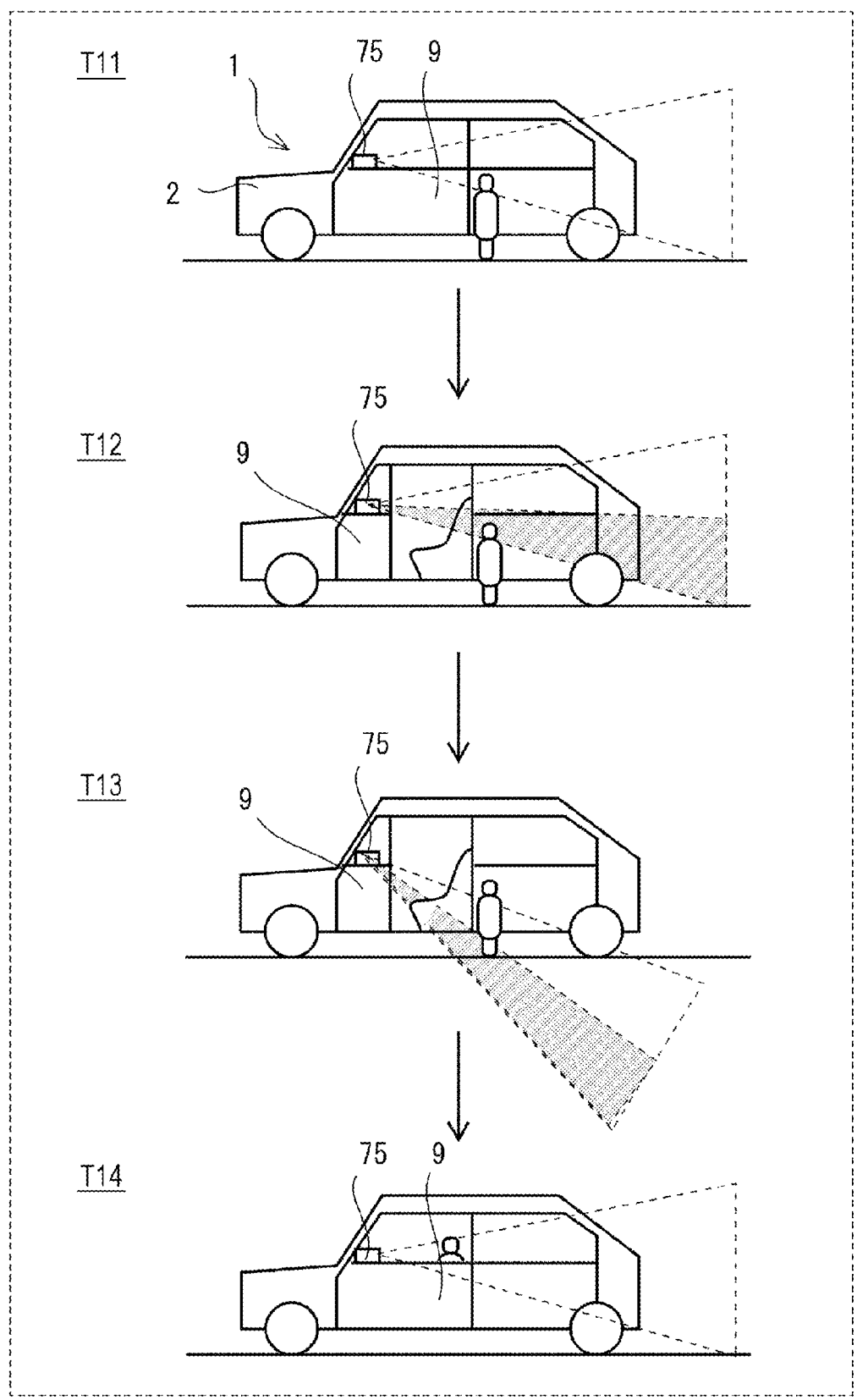
FIG. 9 illustrates side views for explaining an example of the top-bottom-direction adjustment of the angle of view of an external-environment left rear camera, which serves as an external-environment camera, disposed on a left front door of the automobile in FIG. 4.

FIG. 9 illustrates side views for explaining an example of the top-bottom-direction adjustment of the angle of view of the external-environment left rear camera 75, which serves as an external-environment camera 26, disposed on the left front door 9 in FIG. 4. FIG. 9 illustrates an example in which the left front door 9 is opened and closed.

In FIG. 9, a physically small child is standing at the back of the left front door 9 outside the automobile 1 and is getting in the automobile 1 to sit in the passenger seat 5.

In FIG. 9, the states of the child at timings T11 through T14 from when the child is standing near the automobile 1 until he/she gets in the automobile 1 are illustrated.

At timing T11, the angle of view of the external-environment left rear camera 75 disposed on the left front door 9 is set in the regular angle to image the left rear side of the automobile 1 in the longitudinal direction of the automobile 1. This enables the external-environment left rear camera 75 to image another automobile 1 located on the left side of the automobile 1 and another one approaching from the left rear side of the automobile 1. The child standing at the back side of the left front door 9 outside the automobile 1 can be imaged by the external-environment left rear camera 75.

At timing T12, the child is opening the left front door 9. The imaging range of the external-environment left rear camera 75 installed on the opened left front door 9 is changed so that the external-environment left rear camera 75 images the left backward area of the left front door 9 in the longitudinal direction of the automobile 1. The child located farther backward than the left front door 9 enters a blind spot hidden by the left front door 9, as indicated by the hatched portion in FIG. 9, and is not imaged by the external-environment left rear camera 75.

At timing T13, the ECU 43 thus executes step ST3 in FIG. 5 to adjust the angle of view of the external-environment left rear camera 75, which serves as an external-environment camera 26. The ECU 43 adjusts the angle of view of the external-environment left rear camera 75 to face downward so that the external-environment left rear camera 75 can image the road surface on the left side of the automobile 1 at a wider angle. Then, the child positioned at the back of the left front door 9 can be imaged through the window glass of the left front door 9.

Then, at timing T14, the child gets in the automobile 1 from the opened left front door 9 and sits in the passenger seat 5. The child having got in the automobile 1 then closes the left front door 9.

When the left front door 9 is closed, the ECU 43 executes step ST7 in FIG. 5 to readjust the angle of view of the external-environment left rear camera 75, which serves as an external-environment camera 26. The ECU 43 changes the direction of the external-environment left rear camera 75 so that the external-environment left rear camera 75 can image the left backward area of the left front door 9 in the longitudinal direction of the automobile 1. Then, the child in the automobile 1 is not imaged by the external-environment left rear camera 75.

As a result of executing step ST4 in FIG. 5, the ECU 43 obtains the image captured by the external-environment left rear camera 75 at the angle of view set at timing T13. As a result of executing step ST8 in FIG. 5, the ECU 43 obtains the image captured by the external-environment left rear camera 75 at the angle of view set at timing T14.

The outside image obtained in step ST4 includes the child, but the outside image obtained in step ST8 does not include the child. The ECU 43 determines in step ST11 in FIG. 5 that there is a change in the presence/absence state of a person outside the automobile 1. The ECU 43 determines in step ST12 that a child has got in the automobile 1 and then increments the count value of the child IN flag 51 by one in step ST13.

When the child sitting in the passenger seat 5 is getting out of the automobile 1, the order of timings T11 through T14 illustrated in FIG. 9 is reversed. In this case, the ECU 43 increments the count value of the child OUT flag 52 in step ST15 in FIG. 5. In this manner, when a child has got in the automobile 1, the count value of the child IN flag 51 is incremented by one, and, when this child has got out of the automobile 1, the count value of the child OUT flag 52 is incremented by one. In this state, the count value of the child IN flag 51 and that of the child OUT flag 52 become equal to each other, and the ECU 43 determines in step ST25 in FIG. 6 that no child is left in the automobile 1. In this case, the ECU 43 does not execute step ST26, that is, an alert is not output.

In contrast, if the child in the passenger seat 5 has not got out of the automobile 1, the ECU 43 does not execute step ST15 in FIG. 5, that is, the count value of the child OUT flag 52 is not incremented. In this state, the count value of the child IN flag 51 and that of the child OUT flag 52 do not match each other, and the ECU 43 determines in step ST25 in FIG. 6 that a child is likely to have been left in the automobile 1. In this case, the ECU 43 executes step ST26, that is, an alert is output.

As described above, the ECU 43 changes the direction of the external-environment left rear camera 75 downward by using the actuator 27, and then causes the external-environment left rear camera 75 to capture images. Based on multiple images captured by the external-environment left rear camera 75 at the changed angle of view, the ECU 43 can predict and determine the presence or the absence of a physically small child. The external-environment left rear camera 75 can capture images by including the road surface near the body 2 of the automobile 1 at the back of the external-environment left rear camera 75. Hence, if a door other than the left front door 9, such as the left rear door 11, is opened and if a physically small child is standing behind the opened left rear door 11 outside the automobile 1, the external-environment left rear camera 75 can still image at least the feet of this child.

In the above-described example discussed with reference to FIG. 9, the ECU 43 changes the direction of the external-environment left rear camera 75 downward in the top-bottom direction. In actuality, however, the ECU 43 can also change the direction of the external-environment left rear camera 75 in the horizontal direction as illustrated in FIG. 8, as well as in the top-bottom direction.

Figure 10:
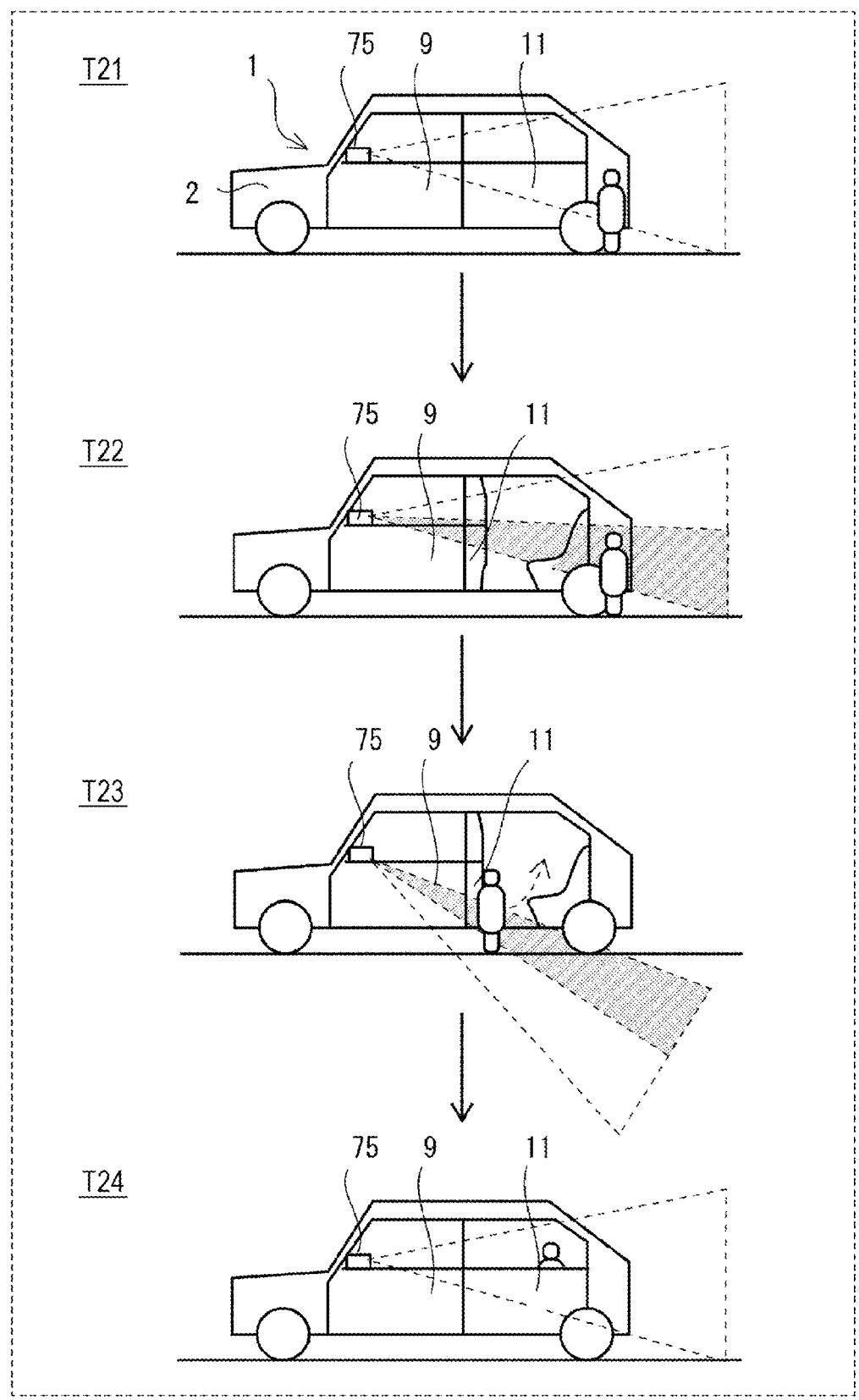
FIG. 10 illustrates side views for explaining an example of the top-bottom-direction adjustment of the angle of view of the external-environment left rear camera, which serves as an external-environment camera, disposed on the left front door of the automobile in FIG. 4.

FIG. 10 illustrates side views for explaining an example of the top-bottom-direction adjustment of the angle of view of the external-environment left rear camera 75, which serves as an external-environment camera 26, disposed on the left front door 9 in FIG. 4. FIG. 10 illustrates an example in which the left rear door 11 is opened and closed.

In FIG. 10, a physically small child is standing at the back of the left rear door 11 outside the automobile 1 and is getting in the automobile 1 to sit in the rear seat 6.

In FIG. 10, the states of the child at timings T21 through T24 from when the child is standing near the automobile 1 until he/she gets in the automobile 1 are illustrated.

At timing T21, the angle of view of the external-environment left rear camera 75 disposed on the left front door 9 is set in the regular angle to image the left rear side of the automobile 1 in the longitudinal direction of the automobile 1. This enables the external-environment left rear camera 75 to image another automobile 1 located on the left side of the automobile 1 and another one approaching from the left rear side of the automobile 1. The child standing at the back side of the left rear door 11 outside the automobile 1 can be imaged by the external-environment left rear camera 75.

At timing T22, the child is opening the left rear door 11. The imaging range of the external-environment left rear camera 75 installed on the left front door 9, which is different from the opened left rear door 11, is changed so that the external-environment left rear camera 75 images the left backward area of the left front door 9 in the longitudinal direction of the automobile 1. The child located farther backward than the left rear door 11 enters a blind spot hidden by the opened left rear door 11, as indicated by the hatched portion in FIG. 10, and is not imaged by the external-environment left rear camera 75.

At timing T23, the ECU 43 thus executes step ST3 in FIG. 5 to adjust the angle of view of the external-environment left rear camera 75, which serves as an external-environment camera 26. The ECU 43 adjusts the angle of view of the external-environment left rear camera 75 to face downward so that the external-environment left rear camera 75 can image the road surface on the left side of the automobile 1 at a wider angle. Then, when the child positioned at the back of the left rear door 11 has approached the left rear door 11 to get in the automobile 1, he/she can be imaged through the area between the left rear door 11 and the road surface.

Then, at timing T24, the child gets in the automobile 1 from the opened left rear door 11 and sits in the rear seat 6. The child having got in the automobile 1 then closes the left rear door 11.

When the left rear door 11 is closed, the ECU 43 executes step ST7 in FIG. 5 to readjust the angle of view of the external-environment left rear camera 75, which serves as an external-environment camera 26. The ECU 43 changes the direction of the external-environment left rear camera 75 so that the external-environment left rear camera 75 can image the left rear side of the left front door 9 in the longitudinal direction of the automobile 1. Then, the child in the automobile 1 is not imaged by the external-environment left rear camera 75.

As a result of executing step ST4 in FIG. 5, the ECU 43 obtains the image captured by the external-environment left rear camera 75 at the angle of view set at timing T23. As a result of executing step ST8 in FIG. 5, the ECU 43 obtains the image captured by the external-environment left rear camera 75 at the angle of view set at timing ST24.

The outside image obtained in step ST4 includes the child, but the outside image obtained in step ST8 does not include the child. The ECU 43 determines in step ST11 in FIG. 5 that there is a change in the presence/absence state of a person outside the automobile 1. The ECU 43 determines in step ST12 that a child has got in the automobile 1 and then increments the count value of the child IN flag 51 by one in step ST13.

When the child sitting in the rear seat 6 is getting out of the automobile 1, the order of timings T21 through T24 illustrated in FIG. 10 is reversed. In this case, the ECU 43 increments the count value of the child OUT flag 52 in step ST15 in FIG. 5. In this manner, when a child has got in the automobile 1, the count value of the child IN flag 51 is incremented by one, and, when this child has got out of the automobile 1, the count value of the child OUT flag 52 is incremented by one. In this state, the count value of the child IN flag 51 and that of the child OUT flag 52 become equal to each other, and the ECU 43 determines in step ST25 in FIG. 6 that no child is left in the automobile 1. In this case, the ECU 43 does not execute step ST26, that is, an alert is not output.

In contrast, if the child in the rear seat 6 has not got out of the automobile 1, the ECU 43 does not execute step ST15 in FIG. 5, that is, the count value of the child OUT flag 52 is not incremented. In this state, the count value of the child IN flag 51 and that of the child OUT flag 52 do not match each other, and the ECU 43 determines in step ST25 in FIG. 6 that a child is likely to have been left in the automobile 1. In this case, the ECU 43 executes step ST26, that is, an alert is output.

As described above, the ECU 43 changes the direction of the external-environment left rear camera 75 downward by using the actuator 27, and then causes the external-environment left rear camera 75 to capture images. Based on multiple images captured by the external-environment left rear camera 75 at the changed angle of view, the ECU 43 can predict and determine the presence or the absence of a physically small child. The external-environment left rear camera 75 can capture images by including the road surface near the body 2 of the automobile 1. Hence, if a physically small child is outside the automobile 1, the external-environment left rear camera 75 can image at least the feet of this child.

In the above-described example discussed with reference to FIG. 10, the ECU 43 changes the direction of the external-environment left rear camera 75 downward in the top-bottom direction. In actuality, however, the ECU 43 can also change the direction of the external-environment left rear camera 75 in the horizontal direction as illustrated in FIG. 8, as well as in the top-bottom direction.

Figure 11:
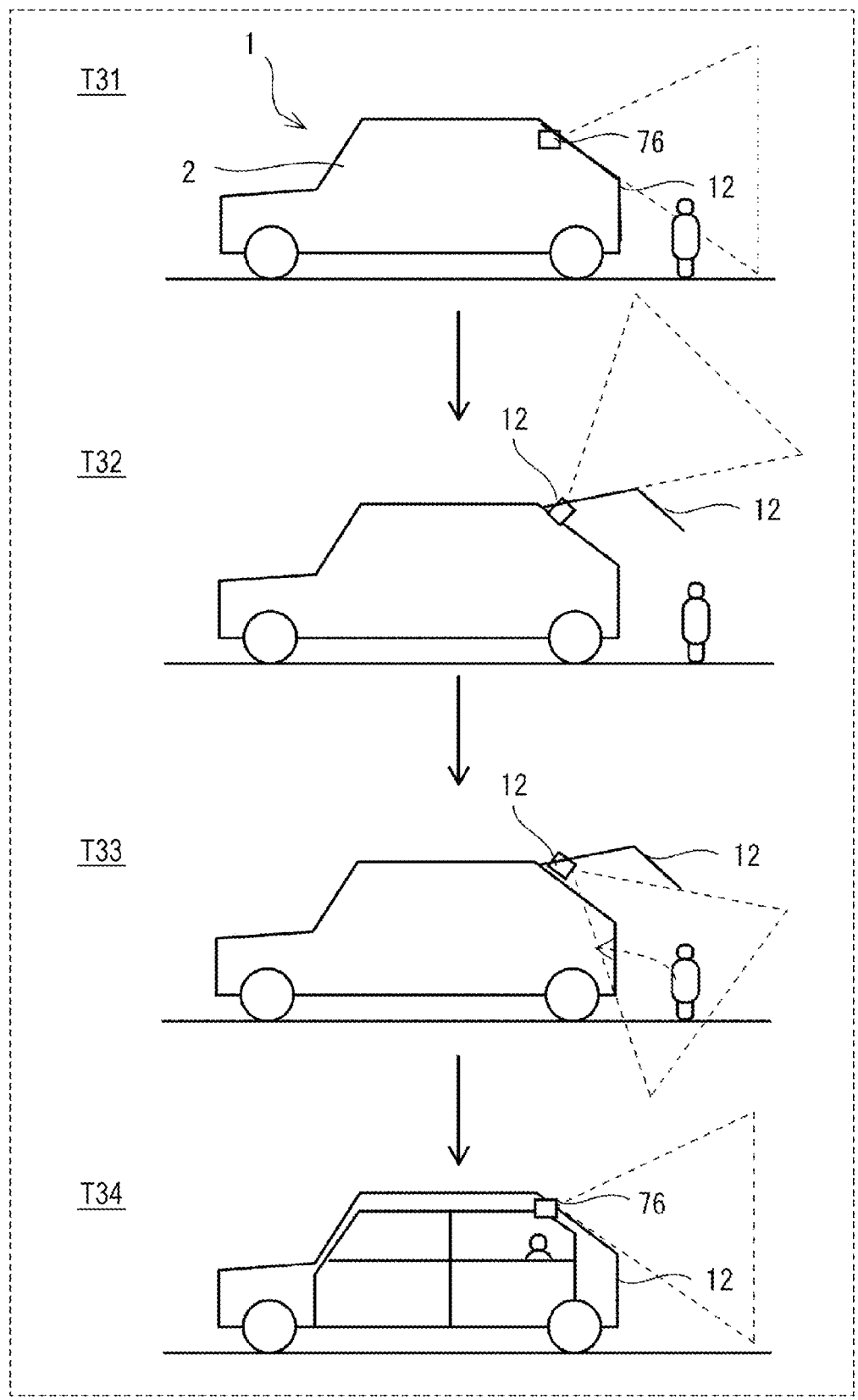
FIG. 11 illustrates side views for explaining an example of the top-bottom-direction adjustment of the angle of view of an external-environment rear camera, which serves as an external-environment camera, disposed on a rear gate of the automobile in FIG. 4.

FIG. 11 illustrates side views for explaining an example of the top-bottom-direction adjustment of the angle of view of the external-environment rear camera 76, which serves as an external-environment camera 26, disposed on the rear gate 12 in FIG. 4.

In FIG. 11, a physically small child is standing at the back of the rear gate 12 outside the automobile 1 and is getting in the automobile 1 from the rear gate 12 to sit in the rear seat 6.

In FIG. 11, the states of the child at timings T31 through T34 from when the child is standing near the automobile 1 until he/she gets in the automobile 1 are illustrated.

At timing T31, the angle of view of the external-environment rear camera 76 disposed on the rear gate 12 is set in the regular angle to image the back side of the automobile 1 in the longitudinal direction of the automobile 1. This enables the external-environment rear camera 76 to image another automobile 1 located at the back side of the automobile 1 and another one approaching from the back side of the automobile 1. The child standing at the back of the rear gate 12 outside the automobile 1 can be imaged by the external-environment rear camera 76.

At timing T32, the child is opening the rear gate 12. The imaging range of the external-environment rear camera 76 installed on the rear gate 12 is changed so that the external-environment rear camera 76 images the top backward area of the rear gate 12 in the longitudinal direction of the automobile 1. The child located farther backward than the rear gate 12 enters a blind spot and is not imaged by the external-environment rear camera 76.

At timing T33, the ECU 43 thus executes step ST3 in FIG. 5 to adjust the angle of view of the external-environment rear camera 76, which serves as an external-environment camera 26. The ECU 43 adjusts the angle of view of the external-environment rear camera 76 to face downward so that the external-environment rear camera 76 can image the road surface on the back side of the automobile 1 at a wider angle. Then, the child positioned at the back of the rear gate 12 can be imaged by the external-environment rear camera 76.

Then, at timing T34, the child gets in the automobile 1 from the opened rear gate 12 and sits in the rear seat 6. The child having got in the automobile 1 then closes the rear gate 12.

When the rear gate 12 is closed, the ECU 43 executes step ST7 in FIG. 5 to readjust the angle of view of the external-environment rear camera 76, which serves as an external-environment camera 26. The ECU 43 changes the direction of the external-environment rear camera 76 so that the external-environment rear camera 76 can image the backward area of the automobile 1 in the longitudinal direction of the automobile 1. Then, the child in the automobile 1 is not imaged by the external-environment rear camera 76.

As a result of executing step ST4 in FIG. 5, the ECU 43 obtains the image captured by the external-environment rear camera 76 at the angle of view set at timing T33. As a result of executing step ST8 in FIG. 5, the ECU 43 obtains the image captured by the external-environment rear camera 76 at the angle of view set at timing T34.

The outside image obtained in step ST4 includes the child, but the outside image obtained in step ST8 does not include the child. The ECU 43 determines in step ST11 in FIG. 5 that there is a change in the presence/absence state of a person outside the automobile 1. The ECU 43 determines in step ST12 that a child has got in the automobile 1 and then increments the count value of the child IN flag 51 by one in step ST13.

When the child sitting in the rear seat 6 is getting out of the automobile 1, the order of timings T31 through T34 illustrated in FIG. 11 is reversed. In this case, the ECU 43 increments the count value of the child OUT flag 52 in step ST15 in FIG. 5. In this manner, when a child has got in the automobile 1, the count value of the child IN flag 51 is incremented by one, and, when this child has got out of the automobile 1, the count value of the child OUT flag 52 is incremented by one. In this state, the count value of the child IN flag 51 and that of the child OUT flag 52 become equal to each other, and the ECU 43 determines in step ST25 in FIG. 6 that no child is left in the automobile 1. In this case, the ECU 43 does not execute step ST26, that is, an alert is not output.

In contrast, if the child in the rear seat 6 has not got out of the automobile 1, the ECU 43 does not execute step ST15 in FIG. 5, that is, the count value of the child OUT flag 52 is not incremented. In this state, the count value of the child IN flag 51 and that of the child OUT flag 52 do not match each other, and the ECU 43 determines in step ST25 in FIG. 6 that a child is likely to have been left in the automobile 1. In this case, the ECU 43 executes step ST26, that is, an alert is output.

As described above, the ECU 43 changes the direction of the external-environment rear camera 76 downward by using the actuator 27, and then causes the external-environment rear camera 76 to capture images. Based on multiple images captured by the external-environment rear camera 76 at the changed angle of view, the ECU 43 can predict and determine the presence or the absence of a physically small child. The external-environment rear camera 76 can capture images by including the road surface at the back of the body 2 of the automobile 1. Hence, if a physically small child is outside the automobile 1, the external-environment rear camera 76 can image at least the feet of this child.

Figure 12:
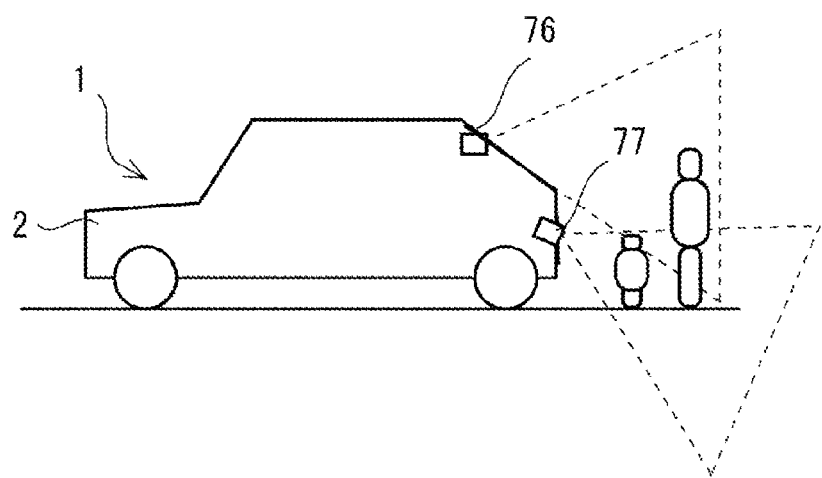
FIG. 12 is a side view of an automobile equipped with another external-environment rear camera at the bottom portion of the rear gate and illustrates an approach to determining the body size of an occupant.

FIG. 12 is a side view of the automobile 1 equipped with another external-environment rear camera 77 at the bottom portion of the rear gate 12. The approach to determining the body size of an occupant will be explained below with reference to FIG. 12.

The external-environment rear camera 77 in FIG. 12 may be installed next to a license plate lamp at the bottom portion of the rear gate 12. The external-environment rear camera 77 at this position may image the road surface right at the back of the automobile 1 to provide a rear-side monitor image when the automobile 1 moves backward.

Since the external-environment rear camera 77 is provided at the bottom portion of the rear gate 12, the imaging range of the external-environment rear camera 76 is farther backward than that of the external-environment rear camera 77.

The ECU 43 may determine that a person included in an image captured by the external-environment rear camera 76 and that by the external-environment rear camera 77 is a physically large adult and a person included only in an image captured by the external-environment rear camera 77 is a physically small child.

The ECU 43 may distinguish a child from an adult, based on the imaging range and the imaging position of an image captured by each external-environment camera 26.

The ECU 43 may determine in step ST12 or ST14 in FIG. 5 whether an object outside and near the automobile 1 is a child or an object other than a child, such as an adult or belongings.

As described above, in the first embodiment, instead of using the opening/closing history of the doors of an automobile to predict whether an occupant has got in or got out of the automobile, an occupant standing outside the automobile 1 to get in is imaged with an external-environment camera 26 (external-environment front camera 71, external-environment right front camera 72, external-environment right rear camera 73, external-environment left front camera 74, external-environment left rear camera 75, or external-environment rear cameras 76 and 77), and it is predicted and determined whether a child is likely to have been left in the automobile 1 alone, based on a change in the presence/absence state of a person or an object outside the automobile 1 in the images captured by the external-environment camera 26. For example, an occupant having got in the automobile 1, who has been previously included in an outside image, is excluded from an outside image. Conversely, an occupant having got out of the automobile 1, who has not been previously included in an outside image, is included in an outside image. In the first embodiment, based on a change in the presence/absence state of a person or an object outside the automobile 1 in images captured by the external-environment camera 26, it is predicted and determined whether a child is likely to have been left in the automobile 1 alone. If the presence of a child in the automobile 1 is determined, an alert can be output.

In this manner, in the first embodiment, when a child having got in the automobile 1 is likely to have been left in the automobile 1, an alert can be output. In contrast, if an occupant has opened a door and placed an object other than a child, such as his/her belongings, it is not determined that a child is being left in the automobile 1. In this case, an alert is not output.

In the first embodiment, outside images captured by the external-environment camera 26 are used for determining the presence of a child. Accordingly, the imaging range is not blocked by components in the automobile 1, such as the seats, unlike the imaging range inside the automobile 1, thereby making it possible to reliably image a physically small child. In short, even if a physically small child gets in or gets out of the automobile 1, he/she can be imaged by the external-environment camera 26 without being blocked, and an alert can be accordingly output.

As discussed above, in the first embodiment, an occupant having got in or got out of the automobile 1 is imaged, and based on the resulting images, a change in the presence/absence state of a person is determined. Hence, unlike making a determination of the presence of an occupant being left in the automobile 1 simply based on the opening/closing history of the doors, the presence of a child can be determined by distinguishing a child from other objects, such as belongings, thereby improving the determination reliability. As a result, an alert can be output substantially appropriately.

Second Embodiment

The alert system 20 for the automobile 1 according to a second embodiment of the disclosure will be described below. The second embodiment will be explained mainly by referring to points different from the first embodiment.

Figure 13:
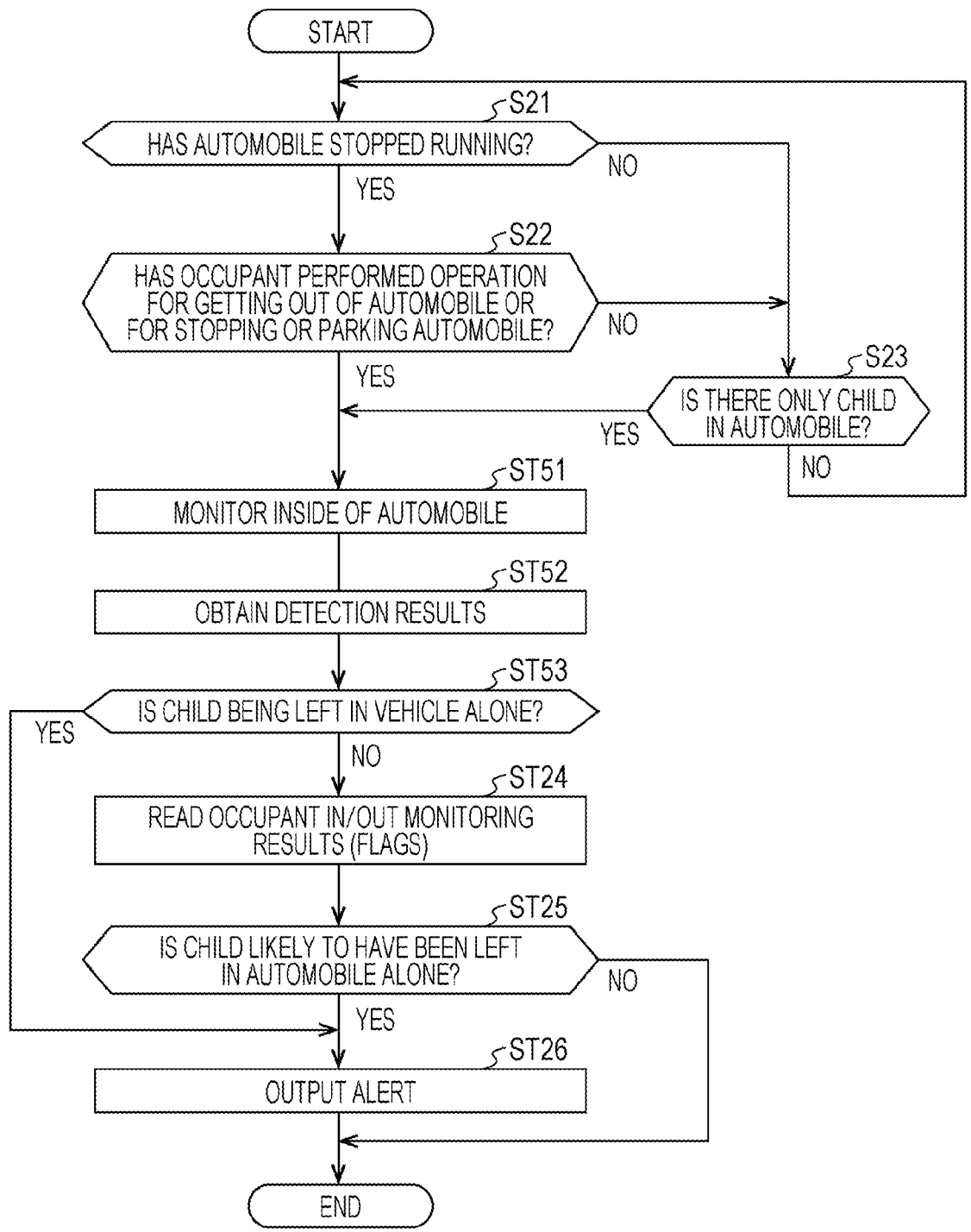
FIG. 13 is a flowchart illustrating control processing executed by the alert system according to an embodiment of the disclosure to determine whether a child is left in the automobile.

FIG. 13 is a flowchart illustrating control processing executed by the alert system 20 of the second embodiment to determine whether a child is left in the automobile 1.

The ECU 43 of the occupant monitoring device 28 of the automobile 1 may repeatedly execute this control processing illustrated in FIG. 13.

Steps ST21 through ST23 and steps ST24 through ST26 in FIG. 13 are similar to those in FIG. 6. In FIG. 13, when it is determined in step ST22 that an occupant has performed a certain operation for getting out of the automobile 1 and is determined in step ST23 based on the child IN/OUT history that only a child is in the automobile 1, the ECU 43 proceeds to step ST51.

In step ST51, the ECU 43 causes the internal-environment camera 22 or the in-vehicle millimeter sensor 21 to monitor the inside of the automobile 1.

In step ST52, the ECU 43 obtains the current image captured by the internal-environment camera 22 or the detection results of the in-vehicle millimeter sensor 21. The ECU 43 then analyzes the obtained information to determine the presence of an occupant including a child in the automobile 1.

In step ST53, the ECU 43 determines whether a child is being left in the automobile 1 alone, based on the in-vehicle detection results obtained in step ST52. The ECU 43 may also determine whether a child will be left in the automobile 1.

If it is determined that a child is being left in the automobile 1 alone or is likely to be left in the automobile 1 alone, based on the current detection results of the internal-environment camera 22 or those of the in-vehicle millimeter sensor 21, the ECU 43 proceeds to step ST26. In this case, the ECU 43 outputs an alert only based on the in-vehicle detection results in step ST26.

If it is not determined that a child is being left in the automobile 1 alone, based on the current in-vehicle detection results of the internal-environment camera 22 or those of the in-vehicle millimeter sensor 21, the ECU 43 proceeds to step ST24. The ECU 43 reads the child IN flag 51 and the child OUT flag 52 indicating the child ON/OFF monitoring results in step ST24 and determines in step ST25 whether a child is being left in the automobile 1 alone, based on the child ON/OFF monitoring results. If a child is being left in the automobile 1 alone, the ECU 43 outputs an alert in step ST26. In contrast, if it is not determined that a child is being left in the automobile 1 alone, based on the child ON/OFF monitoring results, the ECU 43 terminates the control processing without executing step ST26. That is, an alert is not output.

As described above, in the second embodiment, the automobile 1 uses the in-vehicle millimeter sensor 21 or internal-environment camera 22, which serves as an in-vehicle sensor, for detecting an occupant in the automobile 1. Then, based on the in-vehicle detection results obtained by an in-vehicle sensor and also based on a change in the presence/absence state of a person or an object outside the automobile 1 in the images captured by the external-environment camera 26, the possibility that a child is being left in the automobile 1 can be predicted and determined.

While the embodiments have been described above, the disclosure is not restricted thereto. Various modifications and/or changes may be made without departing from the spirit and scope of the disclosure.

For example, in the above-described embodiments, the control operations illustrated in FIGS. 5, 6, and 7 or FIGS. 5, 13, and 7 are all executed by the ECU 43 of the occupant monitoring device 28. However, all or some of the control operations may be executed by another ECU 43 provided in the control system of the automobile 1 other than the ECU 43 of the occupant monitoring device 28. Plural ECUs 43 in the control system of the automobile 1 may execute the control operations in collaboration.

The alert system 20 illustrated in FIG. 3 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the alert system 20 including the in-vehicle millimeter sensor 21, internal-environment camera 22, door opening/closing sensor 23, door lock sensor 24, ignition switch 25, external-environment camera 26, actuator 27, occupant monitoring device 28, meter panel 29, horn 30, and wireless communicator 31. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 3.

The invention claimed is:

1. An alert system comprising:
an external-environment camera configured to capture images outside of a vehicle;
a vehicle sensor configured to detect an operation of the vehicle that is performed when an occupant gets in or when the occupant gets out of the vehicle;
an actuator configured to change a direction of the external-environment camera to at least one of a downward direction and a backward direction in response to the vehicle sensor detecting the operation of the vehicle;
a determiner configured to determine whether a child is likely to have been left in the vehicle based on a change in the images from one of a presence state and an absence state of the occupant or an object outside the vehicle in a first image of the images to another of the presence state and the absence state of the occupant or the object in a second image of the images; and
an alert controller configured to output an alert in a case where the child is likely to have been left in the vehicle.

2. The alert system according to claim 1,
wherein the determiner is configured to:
determine a presence state or an absence state of the child outside the vehicle in the captured images by the external-environment camera every time the vehicle sensor detects the operation of the vehicle; and
determine whether the child has got in the vehicle based on a change in the captured images from the presence state of the child outside the vehicle to the absence state of the child outside the vehicle in the first image of the captured images, or whether the child has got out of the vehicle based on a change in the captured images from the absence state of the child outside the vehicle to the presence state of the child outside the vehicle in the second image of the captured images, each of the captured images being captured when the occupant has got in or got out of the vehicle.

3. The alert system according to claim 2,
wherein the determiner is configured to determine the presence state or the absence state of the child outside the vehicle in the captured images by the external-environment camera after the vehicle sensor has detected the operation of the vehicle and after the actuator has changed the direction of the external-environment camera to at least one of the downward direction or the backward direction.

4. The alert system according to claim 3, further comprising an in-vehicle sensor configured to perform detection of the occupant inside the vehicle,
wherein the determiner is configured to determine whether the child is likely to have been left in the vehicle, based on the change in the presence state or the absence state of the occupant or the object outside the vehicle in the images and based on the detection of the occupant.

5. The alert system according to claim 3, further comprising a memory configured to record a flag, a value of the flag being changed in a case where the determiner has determined that the child has got in or got out of the vehicle, wherein
the determiner is configured to:
determine whether the child is likely to have been left in the vehicle in a case where (1) the vehicle has stopped driving, (2) an operation for stopping the vehicle or getting out of the vehicle is performed, or (3) there is only the child in the vehicle; and
refer to the value of the flag to determine whether the child is likely to have been left in the vehicle, based on the change in the presence state or the absence state of the occupant or the object outside the vehicle in the images, and
the alert controller is configured to:
output the alert in a case where the determiner determines based on the value of the flag that the child is likely to have been left in the vehicle; and
output no alert in a case where the determiner determines based on the value of the flag that no child is likely to have been left in the vehicle.

6. The alert system according to claim 2, further comprising a memory configured to record a flag, a value of the flag being changed in a case where the determiner has determined that the child has got in or got out of the vehicle, wherein the determiner is configured to:
　determine whether the child is likely to have been left in the vehicle in a case where (1) the vehicle has stopped driving, (2) an operation for stopping the vehicle or getting out of the vehicle is performed, or (3) there is only the child in the vehicle; and
　refer to the value of the flag to determine whether the child is likely to have been left in the vehicle, based on the change in the presence state or the absence state of the occupant or the object outside the vehicle in the images, and
the alert controller is configured to:
　output the alert in a case where the determiner determines based on the value of the flag that the child is likely to have been left in the vehicle; and
　output no alert in a case where the determiner determines based on the value of the flag that no child is likely to have been left in the vehicle.

7. The alert system according to claim 2, further comprising an in-vehicle sensor configured to perform detection of the occupant inside the vehicle,
　wherein the determiner is configured to determine whether the child is likely to have been left in the vehicle, based on the change in the presence state or the absence state of the occupant or the object outside the vehicle in the images and based on the detection of the occupant.

8. The alert system according to claim 2, wherein the vehicle sensor is constituted by at least one of a door lock sensor configured to detect locking/unlocking of a door of the vehicle or a door opening/closing sensor configured to detect opening/closing of the door of the vehicle.

9. The alert system according to claim 8, further comprising a memory configured to record a flag, a value of the flag being changed in a case where the determiner has determined that the child has got in or got out of the vehicle, wherein
the determiner is configured to:
　determine whether the child is likely to have been left in the vehicle in a case where (1) the vehicle has stopped driving, (2) an operation for stopping the vehicle or getting out of the vehicle is performed, or (3) there is only the child in the vehicle; and
　refer to the value of the flag to determine whether the child is likely to have been left in the vehicle, based on a change in the presence state or the absence state of the occupant or the object outside the vehicle in the images, and
the alert controller is configured to:
　output the alert in a case where the determiner determines based on the value of the flag that the child is likely to have been left in the vehicle; and
　output no alert in a case where the determiner determines based on the value of the flag that no child is likely to have been left in the vehicle.

10. The alert system according to claim 8, further comprising an in-vehicle sensor configured to perform detection of the occupant inside the vehicle,
　wherein the determiner is configured to determine whether the child is likely to have been left in the vehicle, based on the change in the presence state or the absence state of the occupant or the object outside the vehicle in the images and based on the detection of the occupant.

11. The alert system according to claim 8,
wherein the determiner is configured to determine the presence state or the absence state of the child outside the vehicle in the captured images by the external-environment camera after the vehicle sensor has detected the operation of the vehicle and after the actuator has changed the direction of the external-environment camera to at least one of the downward direction or the backward direction.

12. The alert system according to claim 11, wherein:
the external-environment camera is provided on an exterior member of the vehicle, the exterior member being openable and closable; and
the actuator is configured to change the direction of the external-environment camera in accordance with whether the exterior member is in an opened state or a closed state, so that the images include a road surface near the vehicle.

13. The alert system according to claim 11, further comprising a memory configured to record a flag, a value of the flag being changed in a case where the determiner has determined that the child has got in or got out of the vehicle, wherein
the determiner is configured to:
　determine whether the child is likely to have been left in the vehicle in a case where (1) the vehicle has stopped driving, (2) an operation for stopping the vehicle or getting out of the vehicle is performed, or (3) there is only the child in the vehicle; and
　refer to the value of the flag to determine whether the child is likely to have been left in the vehicle, based on the change in the presence state or the absence state of the occupant or the object outside the vehicle in the images, and
the alert controller is configured to:
　output the alert in a case where the determiner determines based on the value of the flag that the child is likely to have been left in the vehicle; and
　output no alert in a case where the determiner determines based on the value of the flag that no child is likely to have been left in the vehicle.

14. The alert system according to claim 11, further comprising an in-vehicle sensor configured to perform detection of the occupant inside the vehicle,
　wherein the determiner is configured to determine whether the child is likely to have been left in the vehicle, based on the change in the presence state or the absence state of the occupant or the object outside the vehicle in the images and based on the detection of the occupant.

15. The alert system according to claim 1, wherein:
the external-environment camera is provided on an exterior member of the vehicle, the exterior member being openable and closable; and
the actuator is configured to change the direction of the external-environment camera in accordance with whether the exterior member is in an opened state or a closed state, so that the images include a road surface near the vehicle.

16. The alert system according to claim 1, further comprising a memory configured to record a flag, a value of the flag being changed in a case where the determiner has determined that the child has got in or got out of the vehicle, wherein
the determiner is configured to:
　determine whether the child is likely to have been left in the vehicle in a case where (1) the vehicle has stopped driving, (2) an operation for stopping the vehicle or getting out of the vehicle is performed, or (3) there is only the child in the vehicle; and refer to the value of the flag to determine whether the child is likely to have been left in the vehicle, based on the change in the presence state or the absence state of the occupant or the object outside the vehicle in the images; and the alert controller is configured to:
output the alert in a case where the determiner determines based on the value of the flag that the child is likely to have been left in the vehicle; and
output no alert in a case where the determiner determines based on the value of the flag that no child is likely to have been left in the vehicle.

17. The alert system according to claim 1, further comprising an in-vehicle sensor configured to perform detection of the occupant inside the vehicle,
wherein the determiner is configured to determine whether the child is likely to have been left in the vehicle, based on the change in the presence state or the absence state of the occupant or the object outside the vehicle in the images and based on the detection of the occupant.

18. An alert system comprising:
an external-environment camera configured to capture images outside of a vehicle;
a vehicle sensor configured to detect an operation of the vehicle that is performed when an occupant gets in or when the occupant gets out of the vehicle;
an actuator configured to change a direction of the external-environment camera to at least one of a downward direction and a backward direction in response to the vehicle sensor detecting the operation of the vehicle; and
circuitry configured to:
determine whether a child is likely to have been left in the vehicle based on a change in the images from one of a presence state and an absence state of the occupant or an object outside the vehicle in a first image of the images to another of the presence state and the absence state of the occupant or the object in a second image of the images; and
output an alert in a case where the child is likely to have been left in the vehicle.

* * * * *